United States Patent
Oh et al.

(10) Patent No.: US 11,347,294 B2
(45) Date of Patent: May 31, 2022

(54) APPARATUS AND METHOD FOR MANAGING POWER IN ELECTRONIC DEVICE USING WAKE-UP PERIOD DETERMINATIONS BASED ON DTIM PERIOD AND BEACON PERIOD

(71) Applicant: Samsung Electronics Co., Ltd., Suwon-si (KR)

(72) Inventors: Jisu Oh, Hwaseong-si (KR); Seyoun Lim, Seoul (KR); Dong-Gi Jang, Suwon-si (KR); Jin-Hyo Kim, Suwon-si (KR); Seyeong Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 15/750,738

(22) PCT Filed: Aug. 5, 2016

(86) PCT No.: PCT/KR2016/008635
§ 371 (c)(1),
(2) Date: Feb. 6, 2018

(87) PCT Pub. No.: WO2017/023140
PCT Pub. Date: Feb. 9, 2017

(65) Prior Publication Data
US 2020/0089306 A1    Mar. 19, 2020

(30) Foreign Application Priority Data

Aug. 6, 2015 (KR) .................. 10-2015-0111149

(51) Int. Cl.
*G06F 1/32* (2019.01)
*G06F 1/3234* (2019.01)
(Continued)

(52) U.S. Cl.
CPC .......... *G06F 1/3234* (2013.01); *G06F 1/3206* (2013.01); *H04B 17/318* (2015.01);
(Continued)

(58) Field of Classification Search
None
See application file for complete search history.

(56) References Cited

U.S. PATENT DOCUMENTS 7,274,929 B1 * 9/2007 Banginwar ....... H04W 52/0258
455/418
9,332,497 B2 * 5/2016 Bhanage .......... H04W 52/0216
(Continued)

FOREIGN PATENT DOCUMENTS

EP        1 684 467 A1   7/2006
KR   10-0647548 B1    11/2006
(Continued)

OTHER PUBLICATIONS

Indian Office Action dated Jun. 8, 2020; Indian Appln. No. 201837005124.
(Continued)

*Primary Examiner* — Danny Chan
(74) *Attorney, Agent, or Firm* — Jefferson IP Law, LLP

(57) ABSTRACT

The present disclosure relates to an apparatus and a method for managing power in an electronic device. According to the various embodiments of the present disclosure, a method for operating an electronic device comprises determining a wake-up period based on at least one of a received signal strength and a state of the electronic device, and controlling a wireless communication module of the electronic device based on the wake-up period.

11 Claims, 21 Drawing Sheets

(51) Int. Cl.
*H04B 17/318* (2015.01)
*G06F 1/3206* (2019.01)
*H04W 40/24* (2009.01)
*H04W 52/02* (2009.01)
*H04W 74/00* (2009.01)

(52) U.S. Cl.
CPC ..... *H04W 40/244* (2013.01); *H04W 52/0216* (2013.01); *H04W 52/0232* (2013.01); *H04W 52/0258* (2013.01); *H04W 74/006* (2013.01)

(56) References Cited

U.S. PATENT DOCUMENTS

| | | | | |
|---|---|---|---|---|
| 2004/0072559 | A1* | 4/2004 | Kakumaru | H04W 52/0229 455/422.1 |
| 2004/0165574 | A1* | 8/2004 | Kakumaru | H04W 52/287 370/349 |
| 2005/0221869 | A1* | 10/2005 | Liu | G06F 1/3209 455/574 |
| 2005/0261037 | A1* | 11/2005 | Raghunath | H04W 52/0229 455/574 |
| 2005/0286422 | A1* | 12/2005 | Funato | H04W 28/02 370/235 |
| 2006/0056322 | A1* | 3/2006 | Simpson | H04W 52/0258 370/278 |
| 2006/0072488 | A1* | 4/2006 | Meier | H04L 12/1886 370/312 |
| 2007/0091847 | A1 | 4/2007 | Lee | |
| 2007/0143637 | A1* | 6/2007 | Tsai | G06F 1/3215 713/300 |
| 2007/0147330 | A1* | 6/2007 | Smith | H04W 52/0229 370/346 |
| 2007/0201413 | A1* | 8/2007 | Laine | H04L 29/12028 370/338 |
| 2007/0211745 | A1* | 9/2007 | Deshpande | H04L 12/18 370/432 |
| 2007/0238438 | A1* | 10/2007 | Alon | H04W 52/0225 455/343.2 |
| 2007/0248034 | A1* | 10/2007 | Hsu | H04W 52/028 370/318 |
| 2009/0103503 | A1* | 4/2009 | Chhabra | H04W 48/20 370/338 |
| 2009/0199037 | A1* | 8/2009 | Venkatesh | G06F 1/12 713/502 |
| 2010/0284318 | A1* | 11/2010 | Sawada | H04W 48/12 370/311 |
| 2010/0296495 | A1* | 11/2010 | Lino | H04L 12/66 370/338 |
| 2010/0315983 | A1 | 12/2010 | Choi et al. | |
| 2011/0069649 | A1* | 3/2011 | Gobriel | H04W 52/0232 370/311 |
| 2013/0029607 | A1* | 1/2013 | Rosener | H04W 24/10 455/67.7 |
| 2014/0105084 | A1* | 4/2014 | Chhabra | H04W 52/0209 370/311 |
| 2014/0211676 | A1 | 7/2014 | Chhabra | |
| 2014/0274044 | A1 | 9/2014 | Lee et al. | |
| 2015/0000889 | A1* | 1/2015 | Bellamkonda | G01K 7/42 165/287 |
| 2015/0219742 | A1* | 8/2015 | Castagnoli | G01S 5/14 370/336 |
| 2015/0350933 | A1* | 12/2015 | Mannemala | H04W 76/18 370/225 |
| 2015/0355308 | A1* | 12/2015 | Ishida | G01S 5/12 455/456.1 |
| 2016/0021612 | A1* | 1/2016 | Matsunaga | H04W 74/0816 370/311 |
| 2016/0192283 | A1 | 6/2016 | Kwak et al. | |
| 2018/0020402 | A1* | 1/2018 | Emmanuel | H04L 12/189 |

FOREIGN PATENT DOCUMENTS

| | | |
|---|---|---|
| KR | 10-2009-0081292 A | 7/2009 |
| KR | 10-2012-0054413 A | 5/2012 |
| KR | 10-2013-0063756 A | 6/2013 |
| WO | 2009/093799 A1 | 7/2009 |
| WO | 2015/037940 A1 | 3/2015 |

OTHER PUBLICATIONS

European Examination Report dated Jan. 28, 2021; European Appln. No. 16 833 376.3-1203.
Korean Office Action with English translation dated May 21, 2021; Korean Appln No. 10-2015-0111149.

* cited by examiner

APPARATUS AND METHOD FOR MANAGING POWER IN ELECTRONIC DEVICE USING WAKE-UP PERIOD DETERMINATIONS BASED ON DTIM PERIOD AND BEACON PERIOD

CROSS-REFERENCE TO RELATED APPLICATIONS

This application is a U.S. National Stage application under 35 U.S.C. § 371 of an International application number PCT/KR2016/008635, filed on Aug. 5, 2016, which is based on and claimed priority of a Korean patent application number 10-2015-0111149, filed on Aug. 6, 2015, in the Korean Intellectual Property Office, the disclosures of which are incorporated by reference herein in their entirety.

TECHNICAL FIELD

The present disclosure relates to a device and a method for managing power in an electronic device.

BACKGROUND

In recent years, electronic devices having a wireless LAN function that enables access to a wireless network have been developed. An electronic device, such as a smartphone, accesses a wireless network using a wireless LAN module via an Access Point (AP) that operates as a bridge and router between the electronic device and the wireless network. Communication using a wireless LAN module is superior in communication speed to other short-range wireless communication technologies. However, if a wireless LAN module is always powered on, power drains quickly from the electronic device.

In order to reduce power consumption, a Power Save Mechanism (PSM) has been proposed. For example, an electronic device adopting the PSM may repeatedly switch between an awake state and a doze or sleep state during a beacon interval, thereby reducing the power consumption of a wireless LAN module.

However, the electronic device may perform the PSM in the wireless LAN module regardless of the state of the electronic device, thus consuming unnecessary power.

SUMMARY

Technical Problem

Therefore, embodiments of the present disclosure are aimed at providing a device and a method for performing a power save mechanism based on the state of an electronic device.

Embodiments of the present disclosure are also aimed at providing a device and a method for determining a wake-up period for performing a power save mechanism based on the state of an electronic device.

In addition, embodiments of the present disclosure are aimed at providing a device and a method for determining a wake-up period using a coprocessor even if a main processor of an electronic device is in a sleep mode.

Technical Solution

An operating method of an electronic device according to various embodiments of the present disclosure, a method for operating an electronic device comprises determining a wake-up period based on at least one of a received signal strength and a state of the electronic device, and controlling a wireless communication module of the electronic device based on the wake-up period.

According to various embodiments of the present disclosure, an electronic device comprises a wireless communication module, and a first processor configured to determine a wake-up period based on at least one of a received signal strength and a state of the electronic device and to control the wireless communication module based on the wake-up period.

Advantageous Effects

Embodiments of the present disclosure may perform a power save mechanism based on the state of an electronic device, thereby minimizing power consumption.

Further, embodiments of the present disclosure may determine a wake-up period for performing a power save mechanism based on the state of an electronic device, thereby minimizing power consumption In addition, embodiments of the present disclosure may determine a wake-up period using a coprocessor even if a main processor of an electronic device is in a sleep mode, thereby minimizing power consumption.

DETAILED DESCRIPTION

Figure 1:
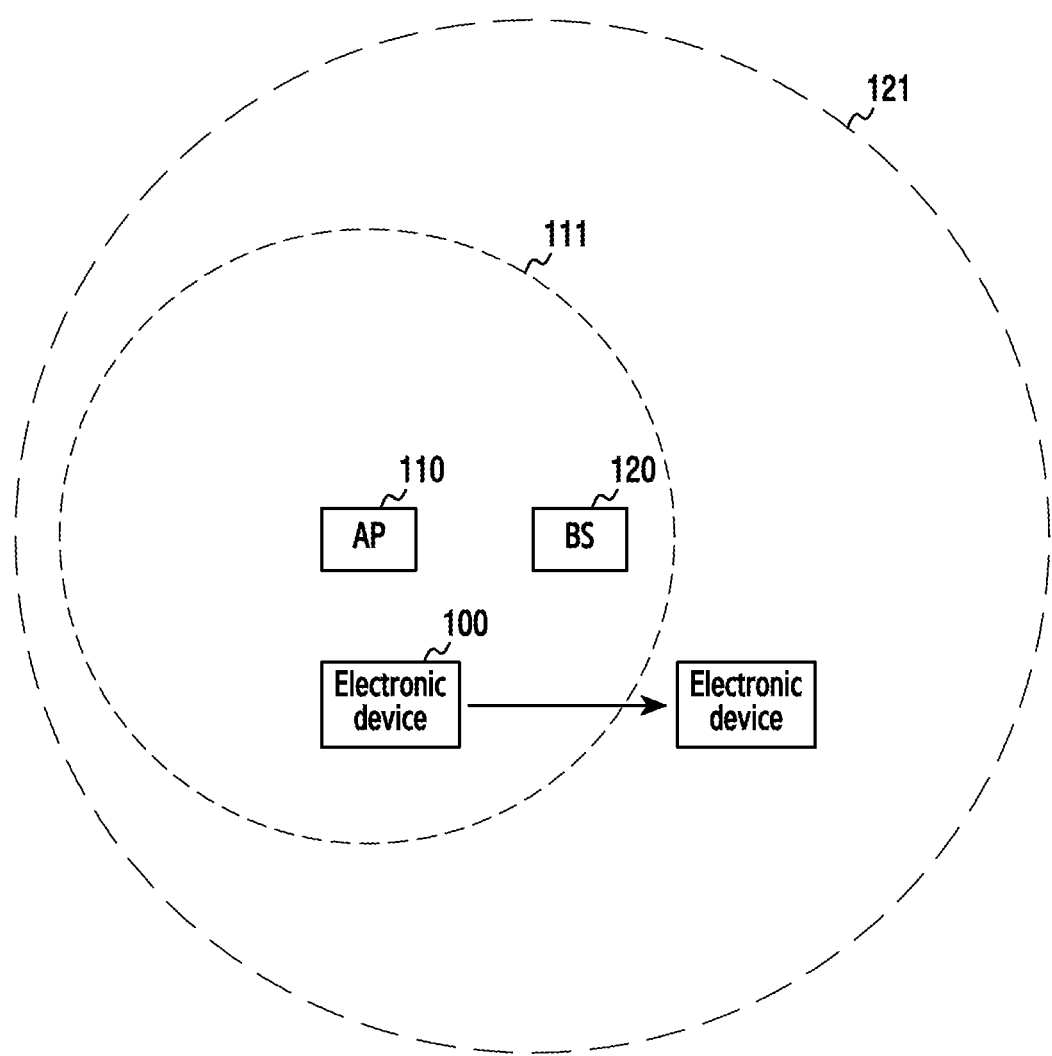
FIG. 1 illustrates the configuration of a communication system according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates the configuration of a communication system according to various embodiments of the present disclosure.

Referring to FIG. 1, the communication system may include an Access Point (AP) 110, a Base Station (BS) 120, and an electronic device 100.

Describing each component, the BS 120 may have a cell 121 in which signals can be transmitted/received, and may transmit a signal to or may receive a signal from an electronic device (e.g., the electronic device 100) located in the cell 121. For example, the BS 120 may be referred to as an eNode B (eNB). The BS 120 may support, for example, a third-generation (3G) communication network or a fourth-generation (LTE) communication network.

Figure 2:
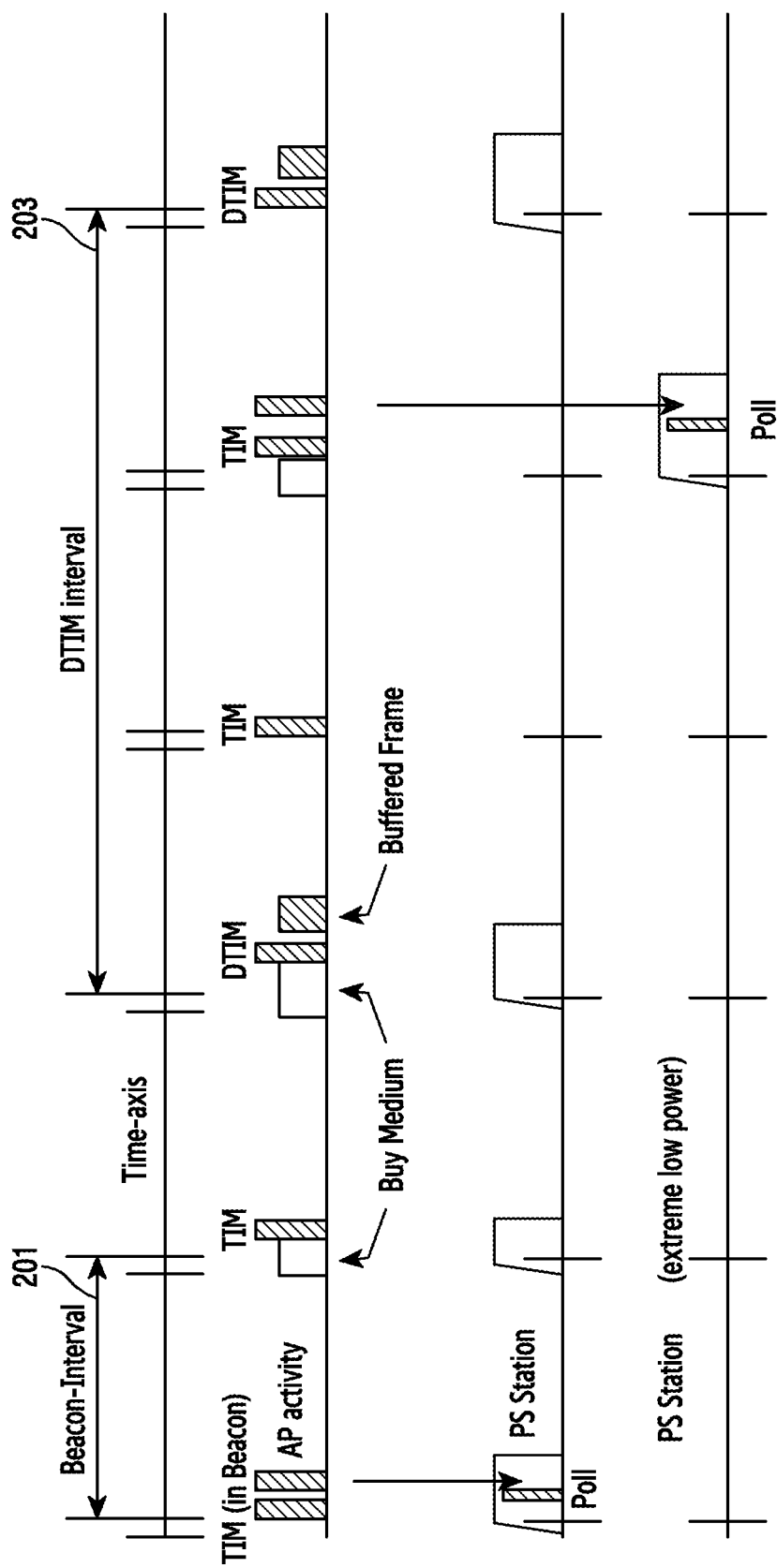
FIG. 2 illustrates a beacon interval and a DTIM interval in a communication system according to various embodiments of the present disclosure.

The AP 110 may have a cell 111 in which signals can be transmitted/received, and may transmit a signal to or may receive a signal from an electronic device (e.g., the electronic device 100) located in the cell 111. For example, the AP 110 may support an IEEE 802.11 series of wireless LAN protocols. In another example, the AP 110 may periodically broadcast a beacon frame according to a preset beacon interval. A beacon interval may be a period during which a beacon frame is transmitted. Referring to FIG. 2, the beacon interval 201 may be, for example, 100 ms.

The beacon frame is a packet periodically transmitted by the AP 110 and may include Service Set Identifier (SSID) information on the AP 110, a Traffic Indication Map (TIM), and a Delivery Traffic Indication Map (DTIM). The SSID may refer to the unique identifier of the AP 110. The TIM may be a packet including a list of hosts to receive data from the AP 110 in a unicast communication mode. The list of hosts may include, for example, an identifier (e.g., an MAC address) of an electronic device (e.g., the electronic device 100).

The DTIM may be a packet that includes a list of host groups to receive data from the AP 110 in a multicast communication mode and indicates that the AP 110 has a packet to broadcast. In a broad sense, the DTIM may be a kind of TIM. In one example, if a DTIM count included in the TIM is 0, a TIM packet may be a DTIM packet. The AP 110 may periodically broadcast a DTIM packet according to a DTIM interval. The DTIM interval 203 may be, for example, a multiple of the beacon interval and may be 300 ms as shown in FIG. 2.

If the electronic device 100 is located in the cell 111 of the AP 110, the electronic device 100 may perform communication with the AP 110. The electronic device 100 may include a wireless LAN module to communicate with the AP 110. If the wireless LAN module is not used, the electronic device 100 may control the wireless LAN module according to a Power Save Mechanism (PSM). For example, the PSM may mean that the wireless LAN module is repeatedly switched between an awake state and the doze or sleep state during the beacon interval. The awake state refers to a state in which data is transmitted/received to/from the AP 110, and the doze state refers to a state in which the wireless LAN module minimally uses power and communication with the AP 110 is performed without transmitting/receiving data. For example, more power may be consumed in the awake state than in the doze state.

The electronic device 100 may repeatedly switch the wireless LAN module between the awake state and the doze state during the beacon interval according to the PSM. The electronic device 100 may receive a TIM packet in the awake state and may check whether there is data for the electronic device 100 to receive by the unicast communication mode. The electronic device 100 may receive a DTIM packet and may check whether there is data for the electronic device 100 by the multicast or broadcast communication mode.

Meanwhile, a wake-up period in which the wireless LAN module repeatedly switches between the awake state and the doze state according to the PSM may be determined based on a beacon period and a DTIM period. The beacon period may refer to a period for receiving a TIM packet, and the DTIM period may refer to a period for receiving a DTIM packet. For example, if the beacon period is 100 ms and the DTIM period is 300 ms, the wake-up period of the wireless LAN module may be 100 ms, because the wireless LAN module needs to switch from the doze state to the awake state and to receive a TIM packet every beacon period.

The DTIM period may be, for example, an integer times the beacon period. The wake-up period may be, for example, the least common multiple of the DTIM period and the beacon period.

The electronic device 100 may operate the wireless LAN module according to the PSM having the wake-up period, thereby saving the power of the electronic device. For example, the electronic device 100 may control the wake-up period based on at least one of the received signal strength of the AP 110 and the state of the electronic device 100. The state of the electronic device 100 may include, for example, at least one of the movement speed of the electronic device 100, the type of a currently running application, the active/sleep mode of the electronic device 100, a state change of the electronic device 100 relating to a notification, and application network usage information.

For example, the active mode of the electronic device 100 may refer to a mode in which a first processor (e.g., a CPU or an AP) included in the electronic device 100 is activated. For example, the sleep mode of the electronic device 100 may refer to a mode in which the first processor (e.g., a CPU or an AP) is deactivated. For example, deactivation may indicate that only a minimum function (e.g., the ability to receive a request for a switch to the active mode from a user's input or another component (e.g., the wireless LAN module)) of the first processor is performed.

In one embodiment, the electronic device 100 may control the wake-up period based on at least one of the received signal strength of the AP 110, the active/sleep mode of the electronic device 100, and the type of a currently running application.

In another embodiment, the electronic device 100 may control the wake-up period based on at least one of the received signal strength of the AP 110, the active/sleep mode of the electronic device 100, the movement speed of the electronic device 100, and a state change of the electronic device 100 relating to a notification.

In still another embodiment, the electronic device 100 may control the wake-up period based on at least one of the received signal strength of the AP 110 and the active/sleep mode of the electronic device 100, and the movement speed of the electronic device 100.

Figure 3:
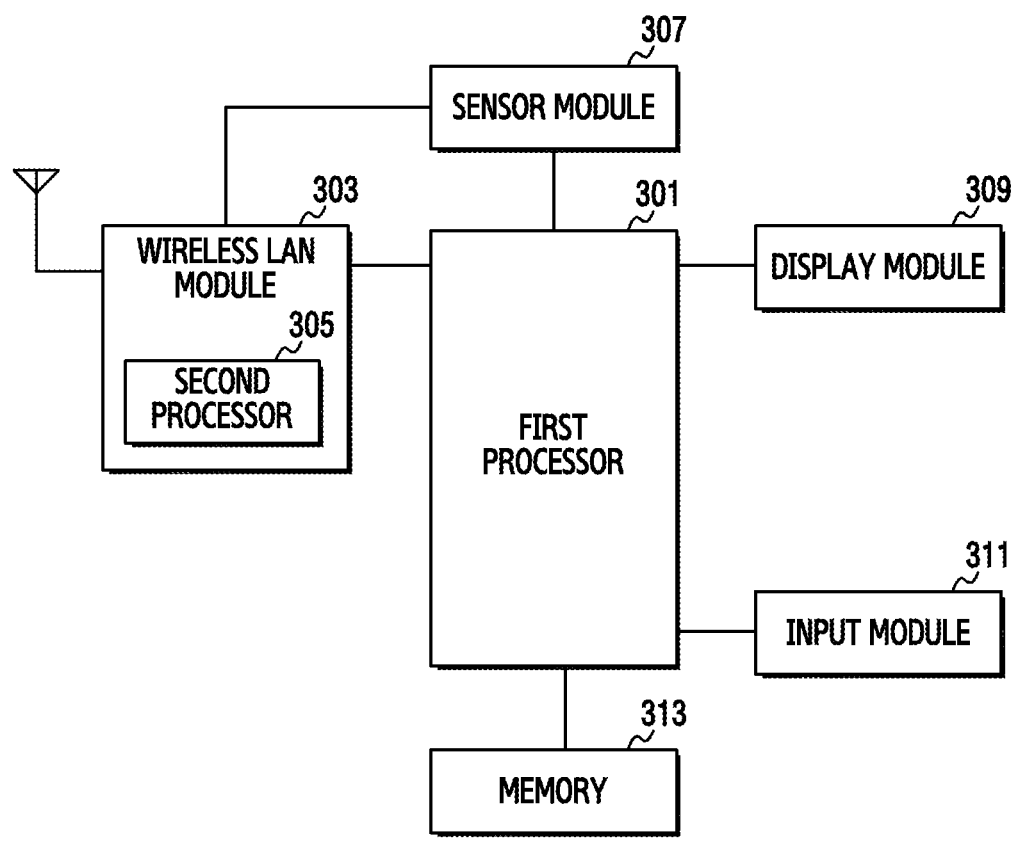
FIG. 3 is a block diagram illustrating the configuration of an electronic device according to a first embodiment of the present disclosure.

FIG. 3 is a block diagram illustrating the configuration of an electronic device according to a first embodiment of the present disclosure.

Referring to FIG. 3, the electronic device 100 may include a first processor 301, a wireless LAN module 303, a second processor 305 included in the wireless LAN module 303, a sensor module 307, a display module 309, an input module 311, and a memory 313.

Describing each component, the input module 311 may include, for example, a touch panel, a (digital) pen sensor, a key, or an ultrasonic input module. The touch panel may use, for example, at least one of an electrostatic type, a pressure-sensitive type, an infrared type, and an ultrasonic type. The touch panel may further include a tactile layer to provide a user with a tactile response. The (digital) pen sensor may, for example, be part of the touch panel or may include a separate recognition sheet. The key may include, for example, a physical button, an optical key, or a keypad. The ultrasonic input module may detect ultrasonic waves generated in an input tool through a microphone and may identify data corresponding to the detected ultrasonic waves.

The display module 309 may include a panel, a hologram module, or a projector. The panel may be configured, for example, to be flexible, transparent, or wearable. The panel may be formed with the touch panel in a single module. The hologram module may display a three-dimensional image in the air using the interference of light. The projector may project light onto a screen to display an image. The screen may be disposed, for example, inside or outside the electronic device 100.

The sensor module 307 may measure, for example, physical quantities or detect an operation state of the electronic device 100 and convert measured or detected information into an electrical signal. The sensor module 307 may include, for example, at least one of a gesture sensor, a gyro sensor, a barometric pressure sensor, a magnetic sensor, an accelerometer, a grip sensor, a proximity sensor, a color sensor (e.g., a red, green, and blue (RGB) sensor), a biometric sensor, a temperature/humidity sensor, an illumination sensor, and an ultraviolet (UV) sensor. The sensor module 307 may further include a control circuit to control at least one or more sensors included therein.

The memory 313 may include, for example, an internal memory or an external memory. The internal memory may include, for example, at least one of a volatile memory (e.g., a Dynamic Random-Access Memory (DRAM), a Static RAM (SRAM), a Synchronous Dynamic RAM (SDRAM), or the like) and a nonvolatile memory (e.g., a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, an NOR flash memory, or the like), a hard drive, or a Solid State Drive (SSD)).

The external memory may further include a flash drive, for example, a compact flash (CF), a secure digital (SD), a micro secure digital (micro-SD), a mini secure digital (mini-SD), an extreme digital (xD), a multi-media card (MMC), a memory stick, or the like. The external memory may be functionally and/or physically connected to the electronic device 100 through various interfaces.

The wireless LAN module 303 may provide a voice call, a video call, a texting service, or an Internet service through a communication network. According to one embodiment, the wireless LAN module 303 may be supplied with power to be turned on. Power may be supplied, for example, under the control of the first processor 301.

The wireless LAN module 303 may check whether a power save mode switch request is received from the first processor 301. The power save mode may refer to, for example, a mode of operating according to the PSM. The power save mode switch request may be, for example, an instruction message requesting the wireless LAN module 303 to operate according to the PSM. The power save mode switch request may be received, for example, along with the wake-up period determined by the first processor 301. As a result of checking, if no power save mode switch request is received, the wireless LAN module 303 may wait to receive a power save mode switch request.

If a power save mode switch request is received, the wireless LAN module 303 may implement the power save mode. For example, if only the power save mode switch request is received, the wireless LAN module 303 may implement the power save mode according to a predefined active wake-up period. In another example, if the power save mode switch request and a determined wake-up period are received together, the wireless LAN module 303 may implement the power save mode according to the determined wake-up period.

The wireless LAN module 303 may check whether a sleep mode entry notification is received from the first processor 301. If no sleep mode entry notification is received, the wireless LAN module 303 may wait to receive a sleep mode entry notification.

If a sleep mode entry notification is received, the wireless LAN module 303 may implement the power save mode according to a predefined default sleep wake-up period. The sleep mode entry notification may be, for example, a message indicating that the first processor 301 is switched from the active mode to the sleep mode. For instance, if the default sleep wake-up period is 100 ms, the wireless LAN module 303 may switch from the doze state to the awake state every 100 ms.

The wireless LAN module 303 may check whether a wake-up period change request is received from the second processor 305. The wake-up period change request may be, for example, an instruction message requesting a change in the wake-up period of the wireless LAN module 303.

If a wake-up period change request is received, the wireless LAN module 303 may implement the power save mode according to a determined wake-up period. For instance, if the current wake-up period is 100 ms and the determined wake-up period is 200 ms, the wireless LAN module 303 may change the wake-up period from 100 ms to 200 ms and may implement the power save mode according to the changed 200 ms.

If no wake-up period change request is received or the power save mode is implemented according to the wake-up period change request, the wireless LAN module 303 may check whether a packet is received from the outside. For example, if communicating with the AP 110, the wireless LAN module 303 may check whether data is received from the AP 110.

If no packet is received, the wireless LAN module 303 may wait to receive a packet. If a packet is received, the wireless LAN module 303 may transmit an active mode entry request to the first processor 301. The active mode entry request may be, for example, an instruction message requesting the first processor 301 to switch from the sleep mode to the active mode. The wireless LAN module 303 may implement the power save mode according to a predefined active wake-up period. For instance, if the active wake-up period is 50 ms, the wireless LAN module 303 may switch from the doze state to the awake state every 50 ms.

The wireless LAN module 303 may check whether a wake-up period change request is received from the first processor 301. For example, the wireless LAN module 303 may receive a wake-up period change request along with a wake-up period determined by the first processor 301.

If no wake-up period change request is received, the wireless LAN module 303 may wait to receive a wake-up period change request. If a wake-up period change request is received, the wireless LAN module 303 may implement the power save mode according to a wake-up period determined by the first processor 301. For instance, if the determined wake-up period is 200 ms, the wireless LAN module 303 may switch from the doze state to the awake state every 200 ms.

The second processor 305 may control some components of the electronic device 100 if the first processor 301 enters the sleep mode. For example, the second processor 305 may control the sensor module 307 and the wireless LAN module 303 if the first processor 301 enters the sleep mode.

According to one embodiment, the second processor 305 may check whether a wake-up period calculation request is received from the first processor. The wake-up period calculation request may be, for example, an instruction message requesting the calculation of the wake-up period of the wireless LAN module 303.

If no wake-up period calculation request is received, the second processor 305 may wait to receive a wake-up period calculation request. If a wake-up period calculation request is received, the second processor 305 may determine the wake-up period of the wireless LAN module 303 based on at least one of the state of the electronic device 100 and a received signal strength and may transmit a wake-up period change request to the wireless LAN module 303. For example, the second processor 305 may determine the wake-up period based on the movement speed of the electronic device 100 and the received signal strength. The wake-up period change request may include, for example, the determined wake-up period.

The second processor 305 may check whether a wake-up period calculation stop request is received from the first processor 301. The wake-up period calculation stop request may be, for example, an instruction message requesting the second processor 305 to stop an operation of calculating a wake-up period.

If no wake-up period calculation stop request is received, the second processor 305 may wait to receive a wake-up period calculation stop request. However, if a wake-up period calculation stop request is received, the second processor 305 may stop an operation of calculating a wake-up period.

According to one embodiment, the second processor 305 may switch between the active mode and the sleep mode based on the wake-up period of the wireless LAN module 303. For example, if the wireless LAN module 303 is in the awake state, the second processor 305 may be in the active mode; if the wireless LAN module 303 is in the doze state, the second processor 305 may be in the sleep mode. For example, the second processor 305 may calculate the wake-up period if the wireless LAN module 303 is in the awake state.

According to one embodiment, the second processor 305 may determine a wake-up period based on the movement speed of the electronic device 100 and a received signal strength.

For example, the second processor 305 may check the received signal strength of the AP 110 involved in communication. The second processor 305 may check whether the received signal strength exceeds a predefined second threshold value. The second threshold value may be, for example, a value corresponding to an intermediate level of the checked received signal strength.

If the received signal strength is less than or equal to the second threshold value, the second processor 305 may determine the wake-up period to be a predefined active wake-up period and may transmit a wake-up period change request to the wireless LAN module. In one example, the second processor 305 may transmit only the wake-up period change request. In another example, the second processor 305 may transmit the wake-up period change request along with an indicator to request the implementation of the power save mode according to the active wake-up period. In still another example, the second processor 305 may transmit the wake-up period change request and the active wake-up period together.

If the received signal strength exceeds the second threshold value, the second processor 305 may check whether the electronic device 100 is traveling. In one example, the second processor 305 may check whether the electronic device 100 is traveling based on a change in the received signal strength. For instance, if the first received signal strength relating to a previously received signal is different from the second received signal strength relating to a currently received signal, the second processor 305 may determine that the electronic device 100 is traveling. However, if the first received signal strength and the second received signal strength are the same, the second processor 305 may determine that the electronic device 100 is not traveling.

In another example, the second processor 305 may check, using the accelerometer included in the sensor module 307, whether the electronic device 100 is traveling. For instance, the accelerometer may monitor the value of the accelerometer and may store the value in a buffer (e.g., the memory 313), and the second processor 305 may check whether the electronic device 100 is traveling based on the value of the accelerometer stored in the buffer. In still another example, the second processor 305 may check, using a Global Positioning System (GPS) module, whether the electronic device 100 is traveling.

If the electronic device 100 is traveling, the second processor 305 may check the movement speed of the electronic device 100. In one example, the second processor 305 may calculate the movement speed of the electronic device 100 based on the accelerometer included in the sensor module 307. In another example, the second processor 305 may calculate the travel distance of the electronic device 100 based on the received signal strength and may calculate the movement speed of the electronic device 100 based on the calculated travel distance. In still another example, the second processor 305 may calculate the travel distance of the electronic device 100 using the coordinates of the GPS module and may calculate the movement speed of the electronic device 100 based on the calculated travel distance.

The second processor 305 may check whether the checked movement speed exceeds a third threshold value or the received signal strength is less than a fourth threshold value. The third threshold value may be determined, for example, based on the user's movement through running or riding a bicycle or car. The fourth threshold value may be determined, for example, based on the received signal strength if the electronic device 100 is out of the reception range of the AP 110.

If the checked movement speed exceeds the third threshold value or the received signal strength is less than the fourth threshold value, the second processor 305 may determine the wake-up period to be a predefined active wake-up period and may transmit a wake-up period change request to the wireless LAN module 303.

However, if the checked movement speed is less than or equal to the third threshold value and the received signal strength is equal to or greater than the fourth threshold value, the second processor 305 may check a beacon count. The beacon count may mean, for example, the number of wake-ups that are switches from the doze state in the sleep mode. For example, a beacon count of 1 may mean that a first wakeup is performed in the sleep mode.

The second processor 305 may check whether the checked beacon count is 1. If the checked beacon count is 1, the second processor 305 may determine the wake-up period to be a default sleep wake-up period and may transmit a wake-up period change request to the wireless LAN module. In one example, the second processor 305 may transmit only the wake-up period change request. In another example, the second processor 305 may transmit the wake-up period change request along with an indicator to request the implementation of the power save mode according to the default sleep wake-up period. In still another example, the second processor 305 may transmit the wake-up period change request and the default sleep wake-up period together.

If the checked beacon count is not 1, the second processor 305 may determine a wake-up period. For example, the second processor 305 may determine a new wake-up period by doubling the current wake-up period. Then, the second processor 305 may check whether the determined wake-up period is less than or equal to a predefined maximum period.

If the determined wake-up period exceeds the maximum period, the second processor 305 may terminate an operation of determining a wake-up period. However, if the determined wake-up period is less than or equal to the maximum period, the second processor 305 may transmit a wake-up period change request to the wireless LAN module 303. For example, the second processor 305 may transmit the wake-up period change request along with the determined wake-up period.

The first processor 301 may control a plurality of hardware or software components connected to the first processor 301 by running an operating system or an application program (application) and may perform various types of data processing and operations. The first processor 301 may be configured, for example, as a System on Chip (SoC). The first processor 301 may load a command or data received from at least one of the other components (e.g., the non-volatile memory) into the volatile memory, may process the command or data, and may store various data in the non-volatile memory. According to one embodiment, the first processor 301 may also be referred to as a controller. The first processor 301 may include, for example, multiple cores.

According to one embodiment, the first processor 301 may check whether an application using the wireless LAN module 303 is run. For example, the application using the wireless LAN module 303 may be run by the user or automatically. The application using the wireless LAN module 303 may be, for example, an audio streaming application, a video streaming application, an application for providing an Internet service, an application for providing an e-mail transmission/reception service, or an application for providing a game service.

If the application using the wireless LAN module 303 is not run, the first processor 301 may wait for the running of the application using the wireless LAN module 303. However, if the application using the wireless LAN module 303 is run, the first processor 301 may supply power to the wireless LAN module 303, may determine the wake-up period of the wireless LAN module 303 based on at least one of the state of the electronic device 100 and the received signal strength, and may transmit a power save mode switch request.

The first processor 301 may determine the wake-up period, for example, based on the type of the application currently running, the active/sleep mode of the electronic device 100, and the movement speed of the electronic device 100. In one example, the first processor 301 may transmit only the power save mode switch request. In another example, the first processor 301 may transmit the power save mode switch request along with the determined wake-up period.

The first processor 301 may check whether no user input occurs for a predefined time. For example, the first processor 301 may determine that no user input has occurred if an input is not received via the input module for the predefined time.

If no user input occurs, the first processor 301 may wait for the occurrence of a user input. However, if a user input occurs, the first processor 301 may transmit a sleep mode entry notification to the wireless LAN module 303 and may transmit a wake-up period calculation request to the second processor 305. Then, the first processor 301 may enter the sleep mode.

The first processor 301 checks whether an active mode entry request is received from the wireless LAN module 303. The active mode entry request may be made, for example, by receiving a packet from the outside.

If no active mode entry request is received, the first processor 301 may wait to receive an active mode entry request. However, if an active mode entry request is received, the first processor 301 may enter the active mode and may transmit a wake-up period calculation stop request to the second processor 305.

The first processor 301 may determine the wake-up period of the wireless LAN module 303 based on the state of the electronic device 100 relating to a notification about the received packet and may transmit a wake-up period change request to the wireless LAN module 303. For example, the first processor 301 may output the notification about the received packet and may then detect a state change of the electronic device 100 within a predefined time. The first processor 301 may determine the wake-up period of the wireless LAN module 303 based on the detected state change of the electronic device 100. For example, the first processor 301 may determine the wake-up period based on the active/sleep mode of the electronic device 100, the state change of the electronic device 100 relating to the notification, and the movement speed of the electronic device 100.

According to one embodiment, the first processor 301 may determine the wake-up period based on the type of the currently running application, the active/sleep mode of the electronic device 100, and the movement speed of the electronic device 100.

In one example, the first processor 301 may check whether the wireless LAN module 303 is stopped. For example, the first processor 301 may determine that the wireless LAN module 303 is stopped if no data packet is received for a predefined time.

If the wireless LAN module 303 is stopped, the first processor 301 may transmit a power save mode switch request to the wireless LAN module 303 and may then terminate an operation of determining a wake-up period.

However, if the wireless LAN module 303 is not stopped, the first processor 301 may check the type of the application currently running. The first processor 801 may check whether the checked application is an audio streaming application. If the checked application is not an audio streaming application, the first processor 301 may check whether the checked application is a video streaming application.

If the checked application is not a video streaming application, the first processor 301 may terminate an operation of determining a wake-up period. However, if the checked application is a video streaming application, the first processor 301 may determine whether a display is turned off. For example, the display may be turned off by a user's request or if a user's request is not input for a predefined time. If the display is not turned off, the first processor 301 may determine to maintain the awake mode of the wireless LAN module 303.

Alternatively, if the display is turned off or the checked application is an audio streaming application, the first processor 301 may check the received signal strength of the AP 110 currently involved in communication. The first processor 301 may check whether the received signal strength is equal to or greater than a first threshold value. The first threshold value may be, for example, a value corresponding to an intermediate level of the checked received signal strength.

If the received signal strength is less than the first threshold value, the first processor 301 may determine to maintain the awake mode of the wireless LAN module 303. For example, the received signal strength that is less than the first threshold value may mean that the received signal strength is less than the intermediate level. If the received signal strength is less than the intermediate level, communication between the AP 110 and the electronic device 100 may be considered to be below a normal state. If communication is below the normal state, changing the wake-up period may degrade the quality of a content service currently being provided, and thus it may be desirable to maintain the awake state of the wireless LAN module 303.

If the received signal strength is equal to or greater than the first threshold value, the first processor 301 may calculate the average bit rate of content and a current transmission rate. In one example, if the application currently running is an audio streaming application, the first processor 301 may calculate the average bit rate of audio content. In another example, if the application currently running is a video stream application, the first processor 301 may calculate the average bit rate of video content can be calculated. Since a bit rate may be variable or fixed depending on the type of content, an average bit rate is used as a reference.

The first processor 301 may check whether the current transmission rate is sufficiently higher than the average bit rate. For example, if the current transmission rate is 1.5 times or higher the average bit rate, the first processor 301 may determine that the current transmission rate is sufficiently higher than the average bit rate. If the current transmission rate is not sufficiently higher than the average bit rate, the first processor 301 may determine to maintain the wireless LAN module 303 in the awake state.

For example, if the current transmission rate is not sufficiently higher than the average bit rate, the current transmission rate and the average bit rate may be considered to be similar. If the current transmission rate and the average bit rate are similar, changing the wake-up period may degrade the quality of the currently provided content service, and thus it may be desirable to maintain the awake state of the wireless LAN module 303.

If the current transmission rate is sufficiently higher than the average bit rate, the first processor 301 may determine a wake-up period. In one example, the first processor 301 may determine a wake-up period based on the current transmission rate and the average bit rate. For instance, if the average bit rate of the content is 200 KB/sec and the current transmission rate is 1 MB/sec, a total of five seconds of content can be buffered with 1-MB content. That is, 200 ms is required to buffer one second of content. In this case, even if a beacon period is set to 500 ms, there is 300 ms of spare time after receiving one second of content (200 KB of data), thus making it possible to reduce the power consumption of the device without degrading service quality by disconnected streaming or the like.

Then, the first processor 301 may transmit a power save mode switch request to the wireless LAN module 303. For example, the first processor 301 may transmit the determined wake-up period and the power save mode switch request together.

According to another embodiment, the first processor 301 may determine the wake-up period of the wireless LAN module 303 based on the state of the electronic device 100 relating to the notification about the received packet.

Figure 17:
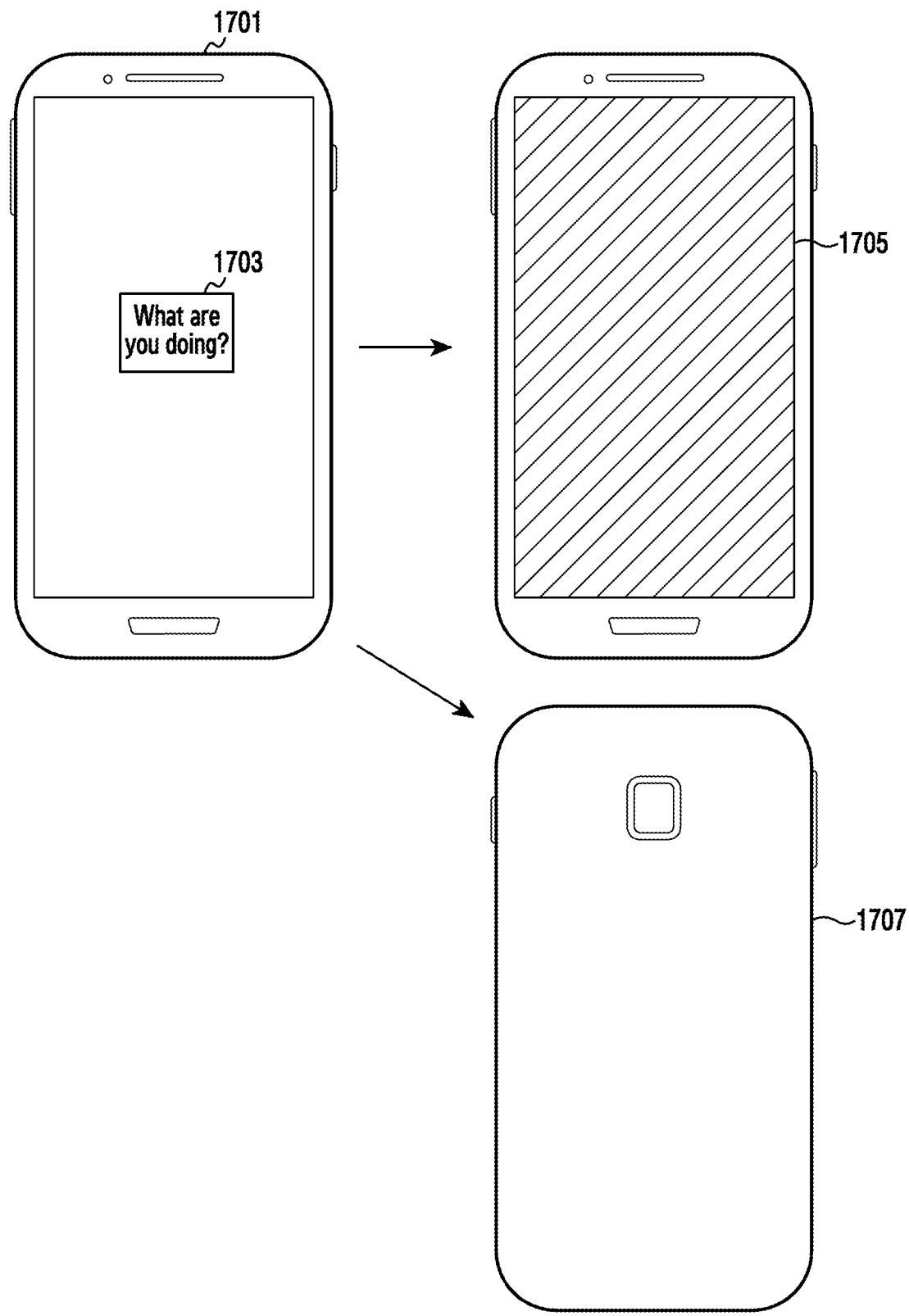
FIG. 17 illustrates the state change of an electronic device relating to a notification about a received packet according to various embodiments of the present disclosure.

In particular, the first processor 301 may output the notification about the received packet. In one example, the first processor 301 may detect the currently received packet from the memory 313, and may display the detected packet on the display if the detected packet is video data. In another example, the first processor 301 may detect the currently received packet from the memory 313, and may output the detected packet through a speaker if the detected packet is audio data. Specifically, as shown in FIG. 17, the first processor 301 may display a notification 1703 on the display.

Then, the first processor 301 may check whether the display is turned off or is in an off state. If the display is not turned off, the first processor 301 may wait for the display to be turned off.

However, if the display is turned off or in the off state, the first processor 301 may check whether the notification is ignored or whether no input occurs for a predefined time. In one example, as shown on a screen 1705 in FIG. 17, if no user input is received for the predefined time after the display is turned off, the first processor 301 may determine that no input has occurred. In another example, if a gesture of ignoring the notification is input from the user, the first processor 301 may determine that the notification is ignored. For instance, as shown in FIG. 17, if a gesture of the user turning the electronic device 100 over is detected after the notification is output, the first processor 301 may determine that the notification is ignored. The gesture of the user may be sensed, for example, by the sensor module 307.

If the notification is ignored or no input occurs, the first processor 301 may determine the wake-up period to be the maximum period and may transmit a wake-up period change request to the wireless LAN module. In one example, the first processor 301 may transmit the wake-up period change request along with the maximum wake-up period. The maximum period may be, for example, a predefined value. Specifically, the maximum period may be one second.

However, if the notification is not ignored and an input occurs, the first processor 301 may check the received signal strength of the AP 110 communicating with the electronic device 100. The first processor 801 may check whether the received signal strength exceeds the predefined second threshold value. If the received signal strength is less than or equal to the second threshold value, the first processor 301 may determine the wake-up period to be the predefined active wake-up period and may transmit a wake-up period change request to the wireless LAN module.

However, if the received signal strength exceeds the second threshold value, the first processor 301 may check whether the electronic device 100 is traveling. If the electronic device 100 is traveling, the first processor 301 may check the movement speed of the electronic device 100. Then, the first processor 301 may check whether the checked movement speed exceeds the third threshold value or the received signal strength is less than the fourth threshold value.

If the checked movement speed is greater than or equal to the third threshold value or the received signal strength is less than or equal to the fourth threshold value, the first processor 301 may determine the wake-up period to be the predefined active wake-up period and may transmit a wake-up period change request to the wireless LAN module.

However, if the electronic device 100 is stopped, the checked movement speed exceeds the third threshold value, or the received signal strength is less than the fourth threshold value, the first processor 301 may determine a wake-up period may transmit a wake-up period change request to the wireless LAN module 303. For example, the first processor 301 may determine a new wake-up period by doubling the current wake-up period.

Figure 4:
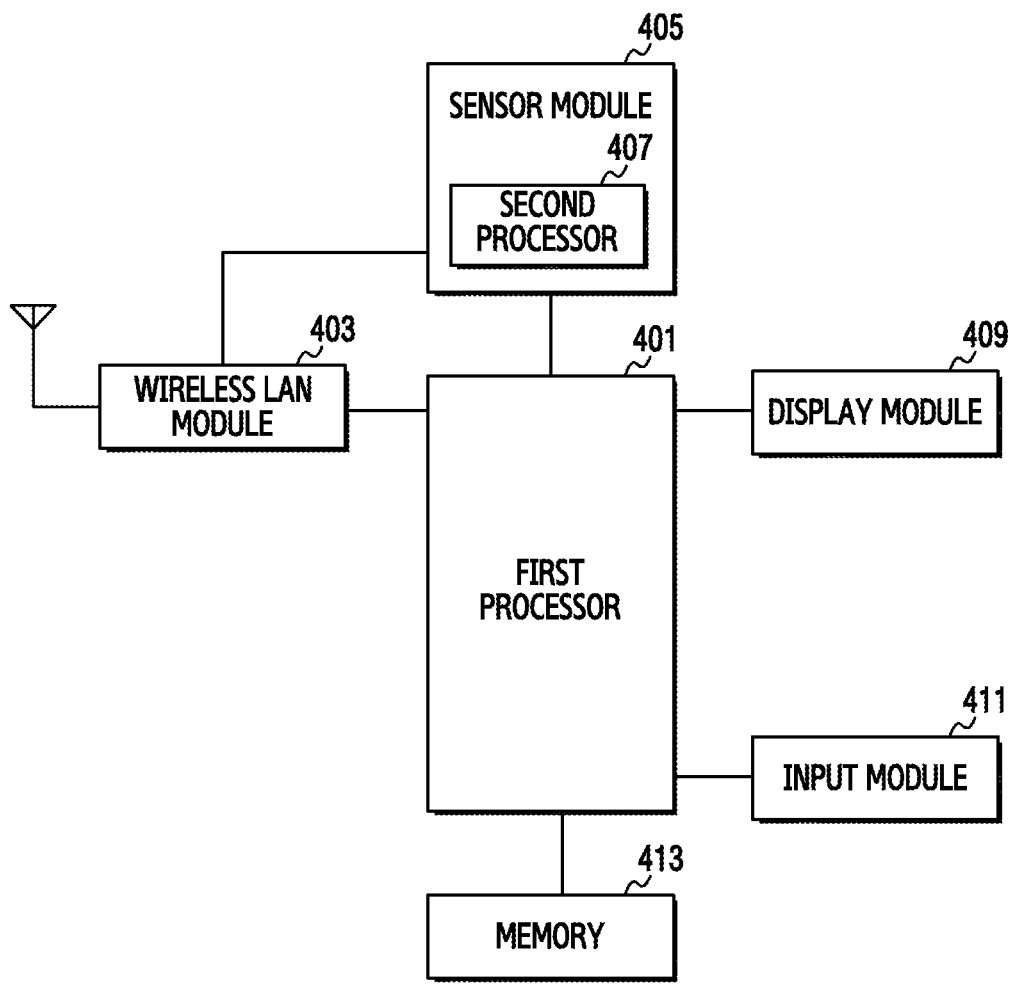
FIG. 4 is a block diagram illustrating the configuration of an electronic device according to a second embodiment of the present disclosure.

FIG. 4 is a block diagram illustrating the configuration of an electronic device according to a second embodiment of the present disclosure.

Referring to FIG. 4, the electronic device 100 may include a first processor 401, a wireless LAN module 403, a sensor module 405, a second processor 407 included in the sensor module 405, a display module 409, an input module 411, and a memory 413.

Compared to FIG. 3, except that the second processor 407 is included in the sensor module 405, the first processor 401, the wireless LAN module 403, the sensor module 405, the second processor 407, the display module 409, the input module 411, and the memory 413 may respectively correspond to the first processor 301, the wireless LAN module 303, the second processor 305, the sensor module 307, the display module 309, the input module 311, and the memory 313 of FIG. 3.

Therefore, a detailed description of the first processor 401, the wireless LAN module 403, the sensor module 405, the second processor 407, the display module 409, the input module 411, and the memory 413 will be omitted.

Figure 5:
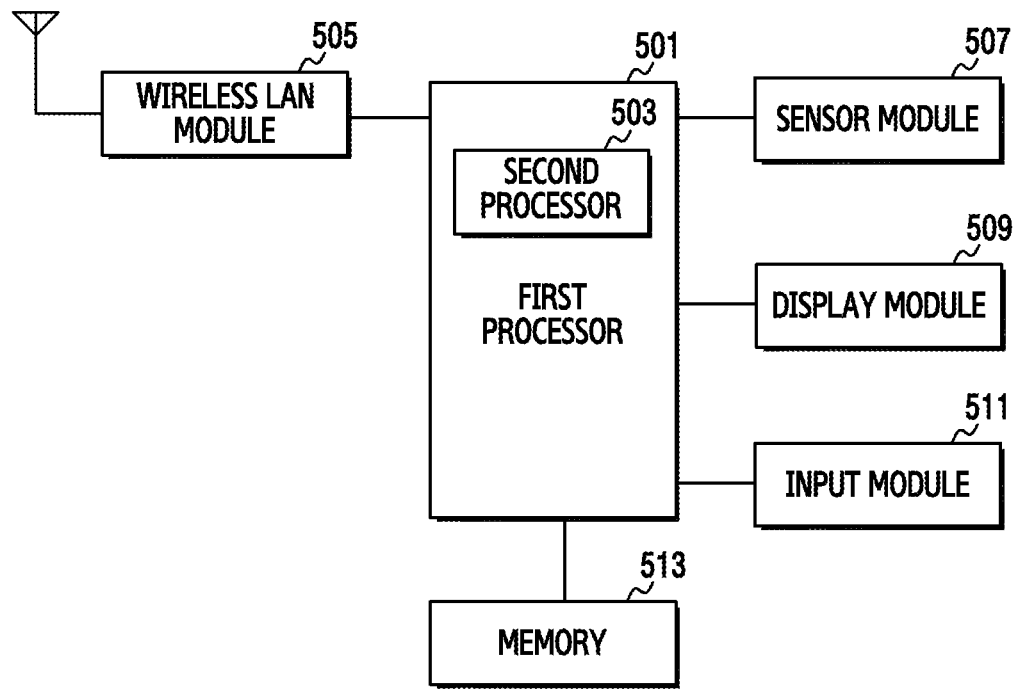
FIG. 5 is a block diagram illustrating the configuration of an electronic device according to a third embodiment of the present disclosure.

FIG. 5 is a block diagram illustrating the configuration of an electronic device according to a third embodiment of the present disclosure.

Referring to FIG. 5, the electronic device 100 may include a first processor 501, a second processor 503 included in the first processor 501, a wireless LAN module 505, a sensor module 507, a display module 509, an input module 511, and a memory 513.

Compared to FIG. 3, except that the second processor 503 is included in the first processor 501, the first processor 501, the second processor 503, the wireless LAN module 505, the sensor module 507, the display module 509, the input module 511, and the memory 513 may respectively correspond to the first processor 301, the second processor 305, the wireless LAN module 303, the sensor module 307, the display module 309, the input module 311, and the memory 313 of FIG. 3. For example, if the first processor 501 includes a plurality of cores, the second processor 503 may be one of the plurality of cores.

Therefore, a detailed description of the first processor 501, the second processor 503, the wireless LAN module 505, the sensor module 507, the display module 509, the input module 511, and the memory 513 will be omitted.

Figure 6:
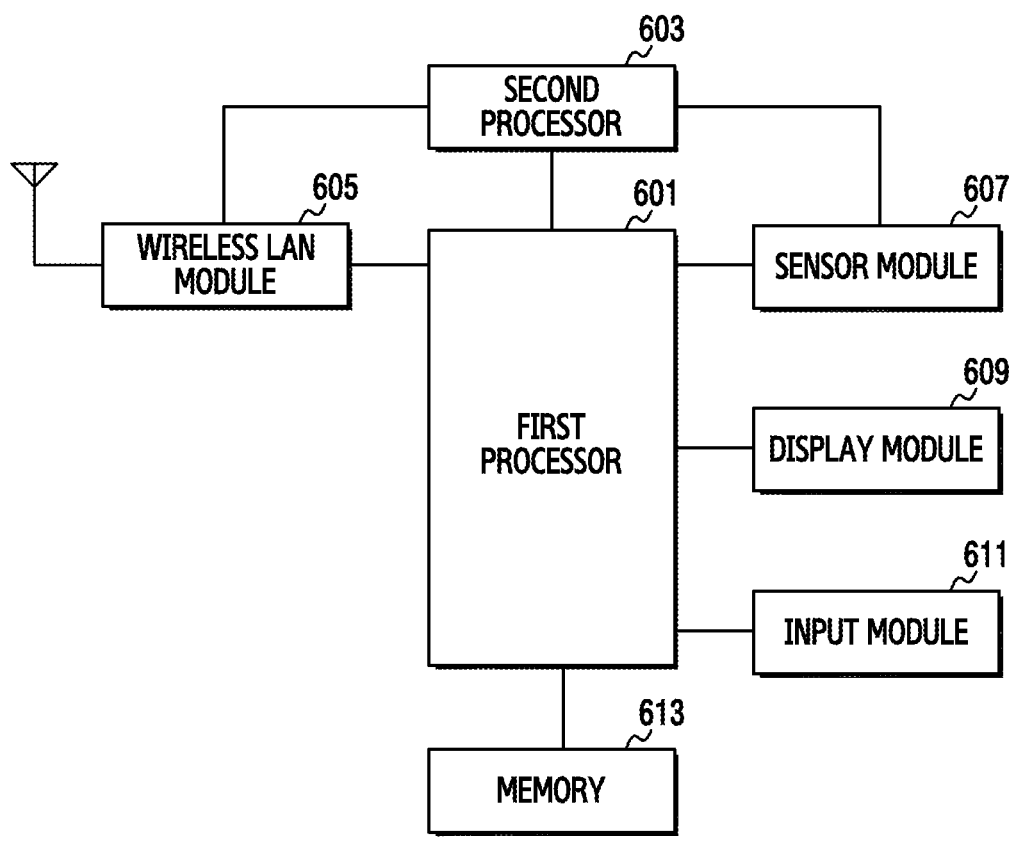
FIG. 6 is a block diagram illustrating the configuration of an electronic device according to a fourth embodiment of the present disclosure.

FIG. 6 is a block diagram illustrating the configuration of an electronic device according to a fourth embodiment of the present disclosure.

Referring to FIG. 6, the electronic device 100 may include a first processor 601, a second processor 603, a wireless LAN module 605, a sensor module 607, a display module 609, an input module 611, and a memory 613.

Compared to FIG. 3, except that the second processor 603 is a separate component that is not included in the wireless LAN module 605, the first processor 601, the second processor 603, the wireless LAN module 605, the sensor module 607, and the display module 609, the input module 611, and the memory 613 may respectively correspond to the first processor 301, the second processor 305, the wireless LAN module 303, the sensor module 307, the display module 309, the input module 311, and the memory 313 of FIG. 3.

Therefore, a detailed description of the first processor 601, the second processor 603, the wireless LAN module 605, the sensor module 607, the display module 609, the input module 611, and the memory 613 will be omitted.

Figure 7:
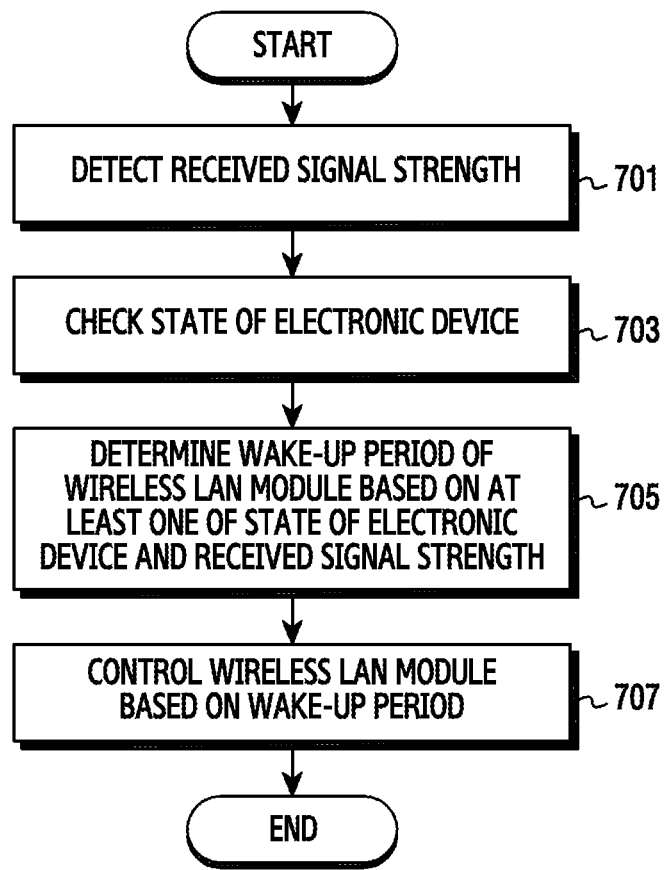
FIG. 7 is a flowchart illustrating that an electronic device controls a wireless LAN module according to various embodiments of the present disclosure.

FIG. 7 is a flowchart illustrating that an electronic device controls a wireless LAN module according to various embodiments of the present disclosure.

Referring to FIG. 7, in operation 701, the electronic device 100 may detect the received signal strength of a signal received from the AP 110. The received signal strength may be, for example, a Received Signal Strength Indicator (RSSI). For example, the RSSI may range from −99 to −35, and a higher number may indicate a stronger signal strength. The electronic device 100 may detect the received signal strength, for example, using a received beacon frame.

In operation 703, the electronic device 100 may check the state of the electronic device 100. The state of the electronic device 100 may include, for example, at least one of the movement speed of the electronic device 100, the type of an application currently running, the active/sleep mode of the electronic device 100, a state change of the electronic device 100 relating to a notification, and a user's electronic device usage history.

In operation 705, the electronic device 100 may determine the wake-up period of a wireless LAN module based on at least one of the state of the electronic device 100 and the received signal strength. For example, the wake-up period may refer to a period on which the wireless LAN module switches from the doze state to the awake state according to the PSM.

In one example, the electronic device 100 may determine the wake-up period based on the received signal strength, the movement speed of the electronic device 100, and the active/sleep mode of the electronic device 100. In another example, the electronic device 100 may determine the wake-up period based on the movement speed of the electronic device 100, the active/sleep mode of the electronic device 100, and the type of an application currently running. In still another example, the electronic device 100 may determine the wake-up period based on the active/sleep mode of the electronic device 100, a state change of the electronic device 100 relating to a notification, and application-specific network usage information.

In operation 707, the electronic device 100 may control the wireless LAN module based on the determined wake-up period. For example, if the determined wake-up period is 200 ms, then the electronic device 100 may switch from the doze state to the awake state every 200 ms.

Figure 8A:
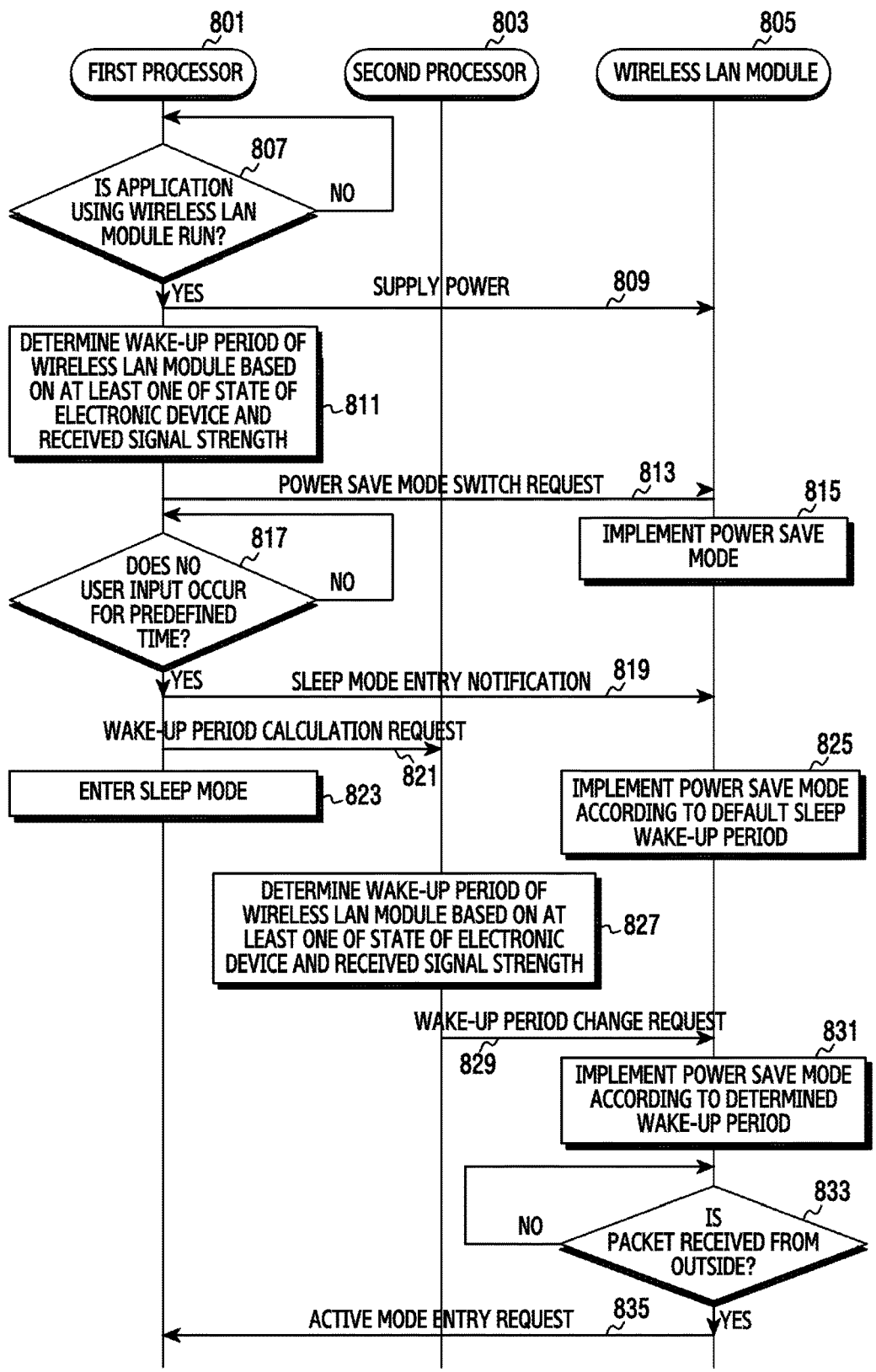
FIGS. 8A and 8B are flowcharts illustrating that an electronic device implements a power save mode of a wireless LAN module according to various embodiments of the present disclosure.
Figure 8B:
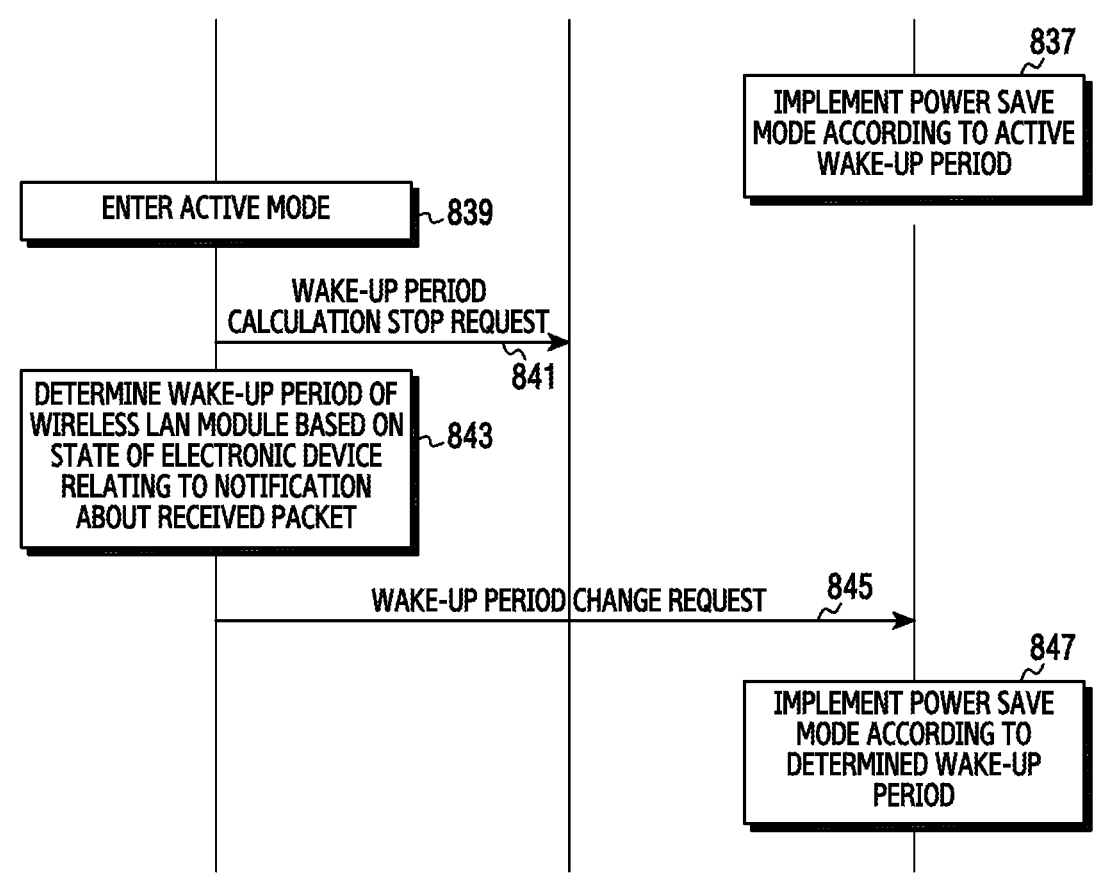

FIGS. 8A and 8B are flowcharts illustrating that an electronic device implements a power save mode of a wireless LAN module according to various embodiments of the present disclosure.

Referring to FIGS. 8A and 8B, in operation 807, a first processor 801 may check whether an application using a wireless LAN module 805 is run. For example, the application using the wireless LAN module 805 may be run by a user or automatically. For example, the application using the wireless LAN module 805 may be an application for providing an audio streaming service relating to content such as music or a radio broadcast (audio streaming application), an application for providing a video streaming service relating to content such as a video (video streaming application), an application for providing an Internet service, an application for providing an e-mail transmission/reception service, or an application for providing a game service.

If the application using the wireless LAN module 805 is run, the first processor 801 may perform operation 809. Otherwise, the first processor 801 may repeat operation 807.

In operation 809, the first processor 801 may supply power to the wireless LAN module 805 to power on the wireless LAN module 805. In operation 811, the first processor 801 may determine the wake-up period of the wireless LAN module 805 based on at least one of the state of the electronic device 100 and a received signal strength.

The state of the electronic device 100 may include, for example, at least one of the movement speed of the electronic device 100, the type of an application currently running, the active/sleep mode of the electronic device 100, a state change of the electronic device 100 relating to a notification, and a user's electronic device usage history. In one example, the first processor 801 may determine the wake-up period based on the type of an application currently running, the active/sleep mode of the electronic device 100, and the movement speed of the electronic device 100.

In operation 813, the first processor 801 may transmit a power save mode switch request to the wireless LAN module 805. The power save mode may refer to, for example, a mode of operating according to the PSM. The power save mode switch request may be, for example, an instruction message requesting the wireless LAN module 805 to operate according to the PSM. In one example, the first processor 801 may transmit the power save mode switch request along with the wake-up period determined in operation 811.

In operation 815, the wireless LAN module 805 may implement the power save mode. In one example, the wireless LAN module 805 may implement the power save mode according to a predefined wake-up period (active wake-up period) if the first processor 801 is in the active mode. In another example, if a determined wake-up period is received, the wireless LAN module 805 may implement the power save mode according to the determined wake-up period.

In operation 817, the first processor 801 may check whether no user input occurs for a predefined time. For example, the first processor 801 may determine that no user input has occurred if an input is not received via an input module for the predefined time.

If no user input occurs, the first processor 801 may perform operation 819. Otherwise, the first processor 801 may repeat operation 817.

In operation 819, the first processor 801 may transmit a sleep mode entry notification to the wireless LAN module 805. The sleep mode entry notification may be, for example, a message indicating that the first processor 801 is switched from the active mode to the sleep mode. In operation 821, the first processor 801 may transmit a wake-up period calculation request to a second processor 803. The wake-up period calculation request may be, for example, an instruction message requesting the calculation of the wake-up period of the wireless LAN module 805. In operation 823, the first processor 801 may enter the sleep mode.

In operation 825, the wireless LAN module 805 may implement the power save mode according to a default sleep wake-up period. The default sleep wake-up period may refer to, for example, a wake-up period predefined by default if the first processor 801 is in the sleep mode.

In operation 827, the second processor 803 may determine the wake-up period of the wireless LAN module 805 based on at least one of the state of the electronic device 100 and the received signal strength. For example, the second processor 803 may determine the wake-up period based on the movement speed of the electronic device 100 and the received signal strength. In operation 829, the second processor 803 may transmit a wake-up period change request to the wireless LAN module 805. The wake-up period change request may be, for example, an instruction message requesting a change in the wake-up period of the wireless LAN module 805. The wake-up period change request may include, for example, the determined wake-up period.

In operation 831, the wireless LAN module 805 may implement the power save mode according to the determined wake-up period. For instance, if the current wake-up period is 100 ms and the determined wake-up period is 200 ms, the wireless LAN module 805 may change the wake-up period from 100 ms to 200 ms and may implement the power save mode according to the changed 200 ms.

In operation 833, the wireless LAN module 805 may check whether a packet is received from the outside. For example, if communicating with the AP 110, the wireless LAN module 805 may check whether data is received from the AP 110. If a packet is received, the wireless LAN module 805 may perform operation 835. Otherwise, the wireless LAN module 805 may repeat operation 833.

In operation 835, the wireless LAN module 805 may transmit an active mode entry request to the first processor 801. The active mode entry request may be, for example, an instruction message requesting the first processor 801 to switch from the sleep mode to the active mode. In operation 837, the wireless LAN module 805 may implement the power save mode according to the active wake-up period.

In operation 839, the first processor 801 may enter the active mode. For example, the first processor 801 may switch from the sleep mode to the active mode. In operation 841, the first processor 801 may transmit a wake-up period calculation stop request to the second processor 803. The wake-up period calculation stop request may be, for example, an instruction message requesting the second processor 803 to stop an operation of calculating a wake-up period. For example, upon receiving a wake-up period calculation stop request, the second processor 803 may stop an operation of calculating a wake-up period.

In operation 843, the first processor 801 may determine the wake-up period of the wireless LAN module 805 based on the state of the electronic device 100 relating to a notification about the received packet. For example, the first processor 801 may output the notification about the received packet and may then detect a state change of the electronic device 100 for a predefined time. The first processor 801 may determine the wake-up period of the wireless LAN module 805 based on the detected state change of the electronic device 100. For example, the first processor 801 may determine the wake-up period based on the active/sleep mode of the electronic device 100, the state change of the electronic device 100 relating to the notification, and the movement speed of the electronic device 100.

In operation 845, the first processor 801 may transmit a wake-up period change request to the wireless LAN module 805. The wake-up period change request may be, for example, an instruction message requesting a change in the wake-up period of the wireless LAN module 805. The wake-up period change request may include, for example, the determined wake-up period.

In operation 847, the wireless LAN module 805 may implement the power save mode according to the determined wake-up period. For instance, if the current wake-up period is 50 ms and the determined wake-up period is 200 ms, the wireless LAN module 805 may change the wake-up period from 50 ms to 200 ms and may implement the power save mode according to the changed 200 ms.

According to one embodiment, the second processor 803 may be included in a particular module or may be present separately in the electronic device 100 depending on various configurations of the electronic device. In one example, as shown in FIG. 3, the second processor 803 may be included in the wireless LAN module 805. In another example, as shown in FIG. 4, the second processor 803 may be included in a sensor module. In still another example, as shown in FIG. 5, the second processor 803 may be included in the first processor 801. In yet another example, as shown in FIG. 6, the second processor 803 may be configured separately from other modules.

According to another embodiment, the second processor 803 may switch between the active mode and the sleep mode based on the wake-up period of the wireless LAN module 805. For example, if the wireless LAN module 805 is in the awake state, the second processor 803 may be in the active mode; and if the wireless LAN module 805 is in the doze state, the second processor 803 may be in the sleep mode. In one example, the second processor 803 may calculate the wake-up period if the wireless LAN module 805 is in the awake state.

Figure 9:
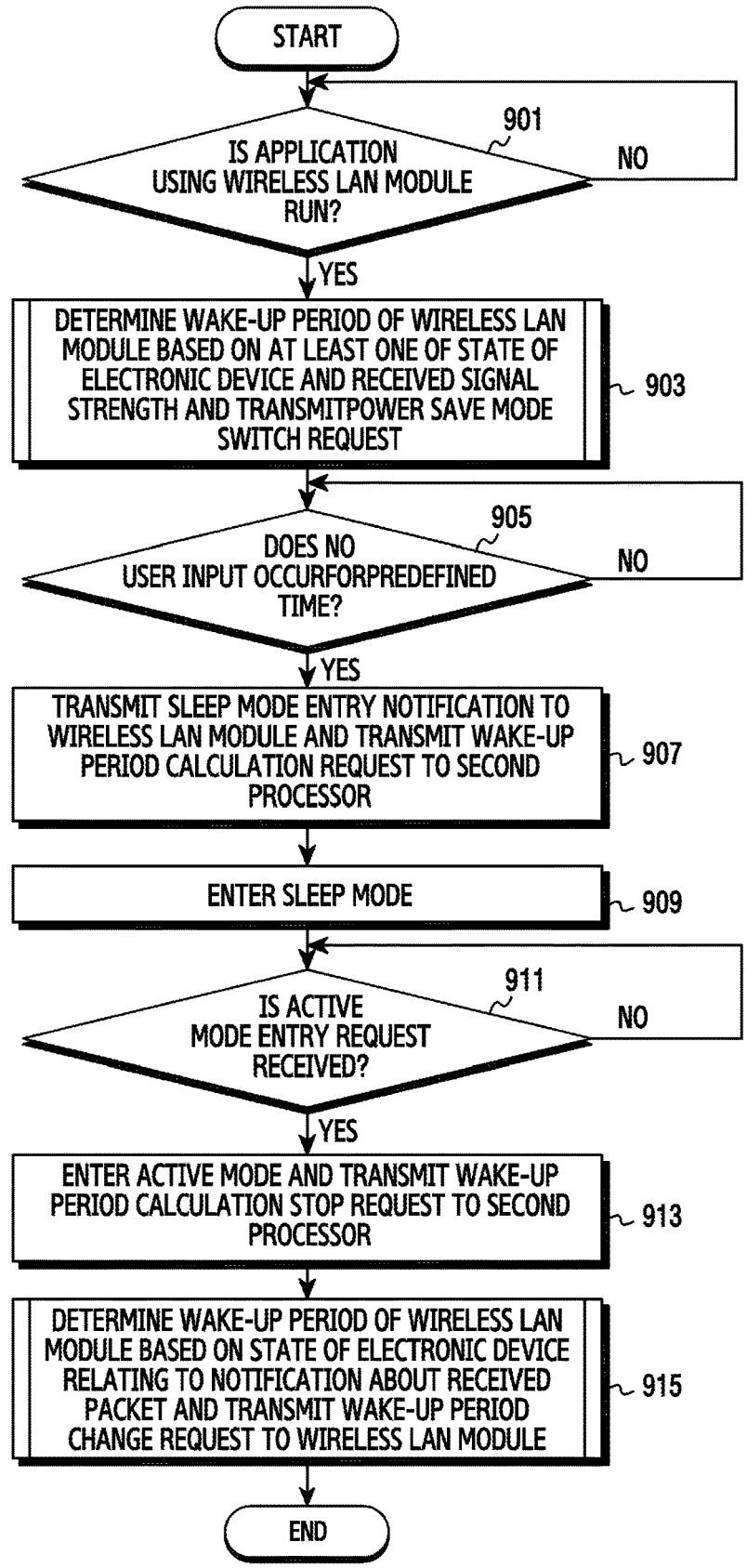
FIG. 9 is a flowchart illustrating that a first processor controls a wake-up period of a wireless LAN module according to various embodiments of the present disclosure.

FIG. 9 is a flowchart illustrating that a first processor controls a wake-up period of a wireless LAN module according to various embodiments of the present disclosure.

Referring to FIG. 9, in operation 901, the first processor 801 may check whether an application using the wireless LAN module 805 is run. For example, the application using the wireless LAN module 805 may be run by a user or automatically. The application using the wireless LAN module 805 may be, for example, an audio streaming application, a video streaming application, an application for providing an Internet service, an application for providing an e-mail transmission/reception service, or an application for providing a game service.

If the application using the wireless LAN module 805 is run, the first processor 801 may perform operation 903. Otherwise, the first processor 801 may repeat operation 901.

In operation 903, the first processor 801 may supply power to the wireless LAN module 805, may determine the wake-up period of the wireless LAN module 805 based on at least one of the state of the electronic device 100 and a received signal strength, and may transmit a power save mode switch request. The first processor 801 may determine the wake-up period, for example, based on the type of a currently running application, the active/sleep mode of the electronic device 100, and the movement speed of the electronic device 100. In one example, the first processor 801 may transmit only the power save mode switch request. In another example, the first processor 801 may transmit the power save mode switch request along with the wake-up period determined in operation 903.

In operation 905, the first processor 801 may check whether no user input occurs for a predefined time. For example, the first processor 801 may determine that no user input has occurred if an input is not received via an input module for the predefined time. If no user input occurs, the first processor 801 may perform operation 907. Otherwise, the first processor 801 may repeat operation 905.

In operation 907, the first processor 801 may transmit a sleep mode entry notification to the wireless LAN module 805 and may transmit a wake-up period calculation request to the second processor 803. In operation 909, the first processor 801 may enter the sleep mode.

In operation 911, the first processor 801 checks whether an active mode entry request is received from the wireless LAN module 805. The active mode entry request may be made, for example, by receiving a packet from the outside. If an active mode entry request is received, the first processor 801 may perform operation 913. Otherwise, the first processor 801 may repeat operation 911.

In operation 913, the first processor 801 may enter the active mode and may transmit a wake-up period calculation stop request to the second processor 803. In operation 915, the first processor 801 may determine the wake-up period of the wireless LAN module 805 based on the state of the electronic device 100 relating to a notification about the received packet and may transmit a wake-up period change request to the wireless LAN module 805. For example, the first processor 801 may output the notification about the received packet and may then detect a state change of the electronic device 100 for a predefined time. The first processor 801 may determine the wake-up period of the wireless LAN module 805 based on the detected state change of the electronic device 100.

For example, the first processor 801 may determine the wake-up period based on the active/sleep mode of the electronic device 100, the state change of the electronic device 100 relating to the notification, and the movement speed of the electronic device 100. The wake-up period change request may include, for example, the determined wake-up period.

Figure 10:
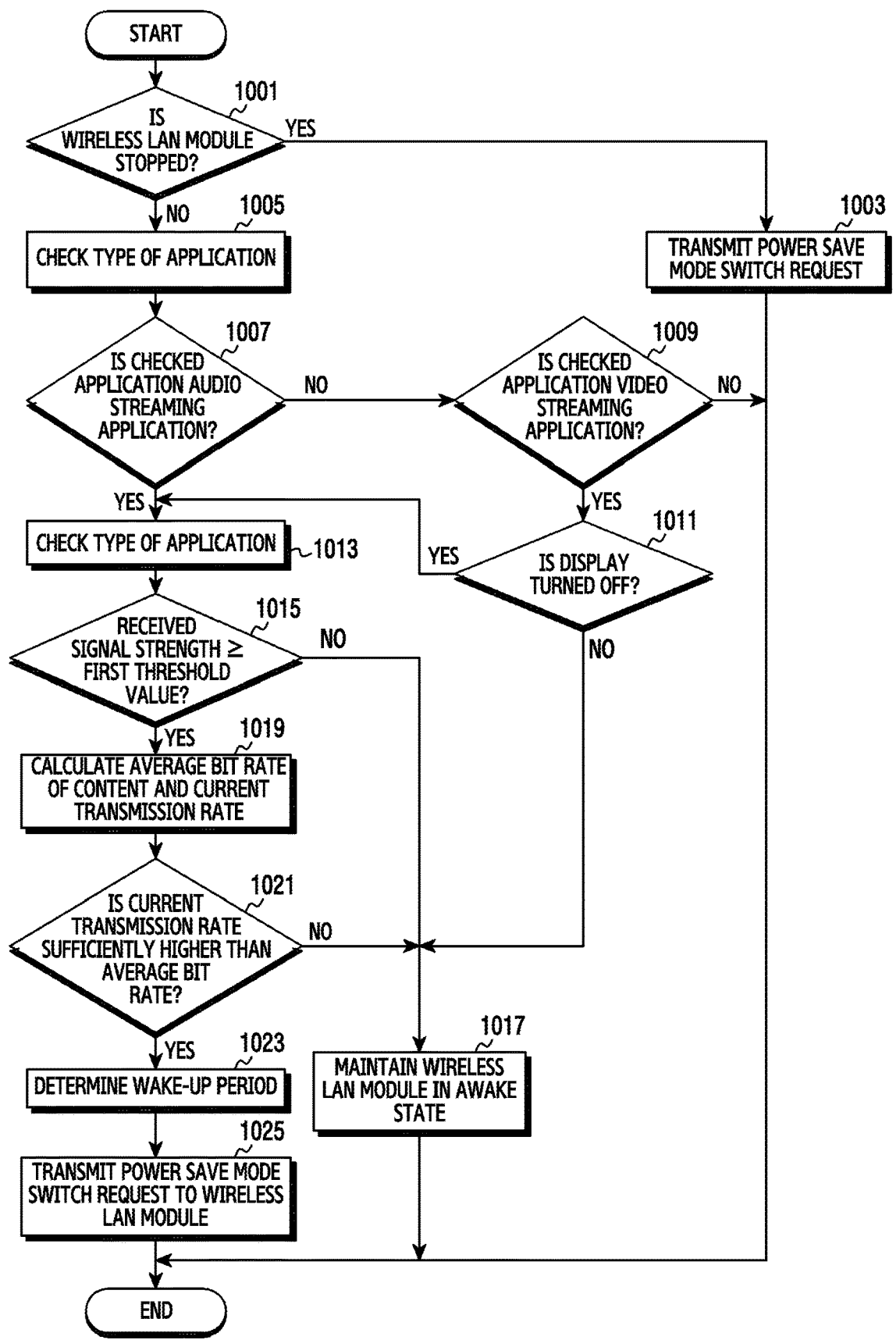
FIG. 10 is a flowchart illustrating that a first processor determines a wake-up period according to a first embodiment of the present disclosure.

FIG. 10 is a flowchart illustrating that a first processor determines a wake-up period according to a first embodiment of the present disclosure.

Referring to FIG. 10, in operation 1001, the first processor 801 may check whether a wireless LAN module 805 is stopped. For example, the first processor 801 may determine that the wireless LAN module 805 is stopped if no data packet is received for a predefined time. If the wireless LAN module 805 is stopped, the first processor 801 may perform operation 1003; otherwise, the first processor 801 may perform operation 1005.

In operation 1003, the first processor 801 may transmit a power save mode switch request to the wireless LAN module 805 and may then terminate an operation of determining a wake-up period.

In operation 1005, the first processor 801 may check the type of a currently running application. In operation 1007, the first processor 801 may check whether the checked application is an audio streaming application. If the checked application is an audio streaming application, the first processor 801 may perform operation 1013; otherwise, the first processor 801 may perform operation 1009.

In operation 1009, the first processor 801 may check whether the checked application is a video streaming application. If the checked application is a video streaming application, the first processor 801 may perform operation 1011; otherwise, the first processor 801 may terminate an operation of determining a wake-up period.

In operation 1011, the first processor 801 may check whether a display is turned off. For example, the display may be turned off by a user's request or if a user's request is not input for a predefined time. If the display is turned off, the first processor 801 may perform operation 1013; otherwise, the first processor 801 may perform operation 1017.

In operation 1013, the first processor 801 may check the received signal strength of the AP 110 currently involved in communication. In operation 1015, the first processor 801 may check whether the received signal strength is equal to or greater than a first threshold value. The first threshold value may be, for example, a value corresponding to an intermediate level of the checked received signal strength. If the received signal strength is equal to or greater than the first threshold value, the first processor 801 may perform operation 1019; otherwise, the first processor 801 may perform operation 1017.

In operation 1019, the first processor 801 may calculate the average bit rate of content and a current transmission rate. In one example, if the currently running application is an audio streaming application, the first processor 801 may calculate the average bit rate of audio content. In another example, if the currently running application is a video stream application, the first processor 801 may calculate the average bit rate of video content. Since a bit rate may be variable or fixed depending on the type of content, an average bit rate is used as a reference.

In operation 1021, the first processor 801 may check whether the current transmission rate is sufficiently higher than the average bit rate. For example, if the current transmission rate is 1.5 times or higher the average bit rate, the first processor 801 may determine that the current transmission rate is sufficiently higher than the average bit rate. If the current transmission rate is equal to or higher than the average bit rate, the first processor 801 may perform operation 1023; otherwise, the first processor 801 may perform operation 1017.

In operation 1017, the first processor 801 may determine to maintain the wireless LAN module 805 in the awake state. For example, the received signal strength that is less than the first threshold value may mean that the received signal strength is less than the intermediate level. If the received signal strength is less than the intermediate level, communication between the AP 110 and the electronic device 100 may be considered to be below a normal state. If communication is below the normal state, changing a wake-up period may degrade the quality of the currently provided content service, and thus it may be desirable to maintain the awake state of the wireless LAN module 805.

In another example, if the current transmission rate is not sufficiently higher than the average bit rate, the current transmission rate and the average bit rate may be considered to be similar. If the current transmission rate and the average bit rate are similar, changing a wake-up period may degrade the quality of the currently provided content service, and thus it may be desirable to maintain the awake state of the wireless LAN module 805.

In operation 1023, the first processor 801 may determine a wake-up period. In one example, the first processor 801 may determine a wake-up period based on the current transmission rate and the average bit rate. For instance, if the average bit rate of the content is 200 KB/sec and the current transmission rate is 1 MB/sec, a total of five seconds of content can be buffered with 1-MB content. That is, 200 ms is required to buffer one second of content. In this case, even if a beacon period is set to 500 ms, there is 300 ms of spare time after receiving one second of content (200 KB of data), thus making it possible to reduce the power consumption of the device without degrading service quality by disconnected streaming or the like.

In operation 1025, the first processor 801 may transmit a power save mode switch request to the wireless LAN module 805. For example, the first processor 801 may transmit the determined wake-up period and the power save mode switch request together.

Figure 11:
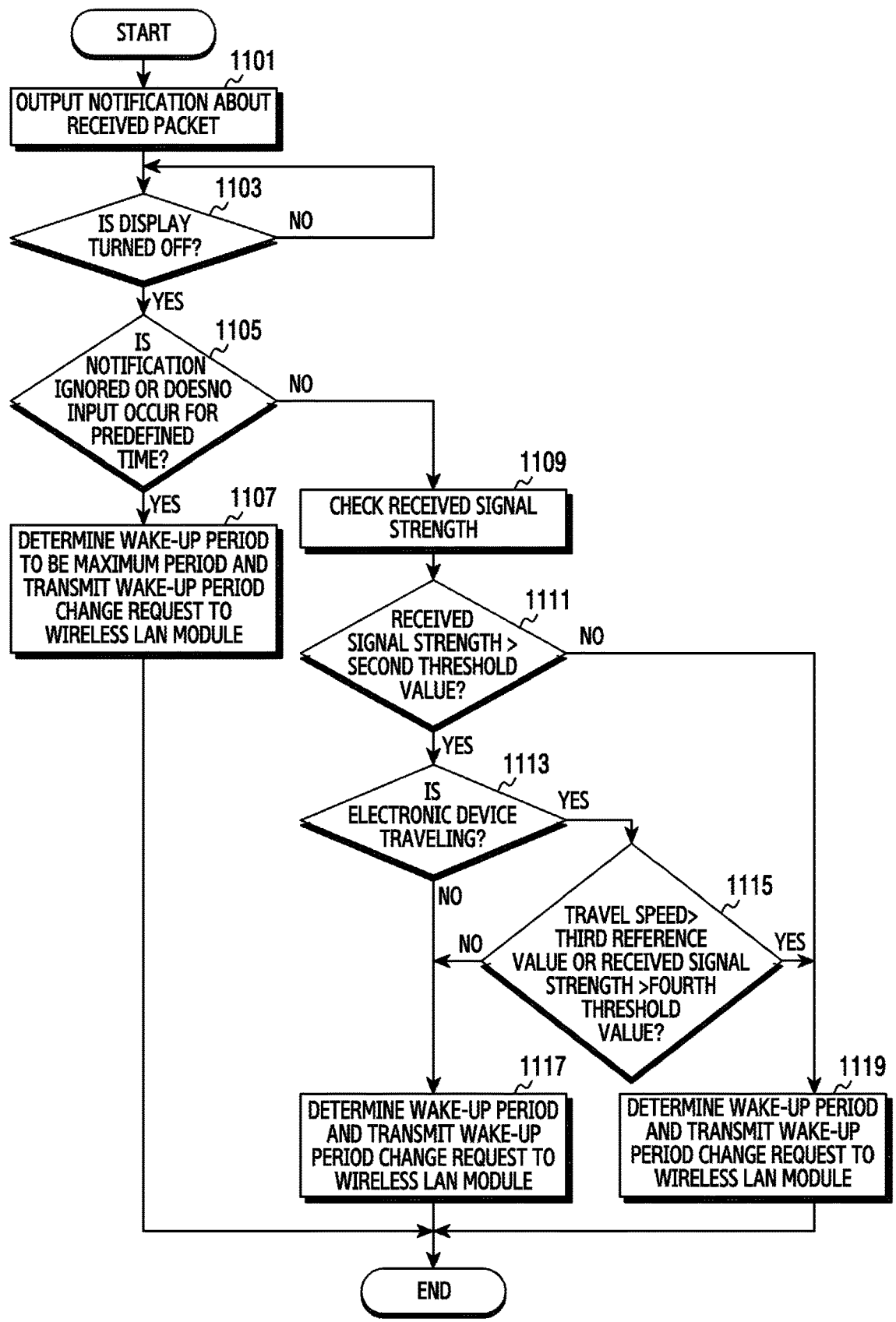
FIG. 11 is a flowchart illustrating that a first processor determines a wake-up period according to a second embodiment of the present disclosure.

FIG. 11 is a flowchart illustrating that a first processor determines a wake-up period according to a second embodiment of the present disclosure.

Referring to FIG. 11, in operation 1101, the first processor 801 may output a notification about a received packet. In one example, the first processor 801 may detect a currently received packet from the memory 313, and may display the detected packet on a display if the detected packet is video data. In another example, the first processor 801 may detect a currently received packet from the memory 313, and may output the detected packet through a speaker if the detected packet is audio data. Specifically, as shown in FIG. 17, the first processor 801 may display a notification 1703 on a display of an electronic device 1701.

In operation 1103, the first processor 801 may check whether the display is turned off or is in an off state. The display in the off state may mean that the display is powered off. For example, the display may be turned off by a user's request or if no user input occurs for a predefined time. If the display is turned off or is in the off state, the first processor 801 may perform operation 1105; otherwise, the first processor 801 may repeat operation 1103.

In operation 1105, the first processor 801 may check whether the notification is ignored or whether no input occurs for a predefined time. In one example, as shown on the screen 1705 in FIG. 17, if no user input is received for the predefined time after the display is turned off, the first processor 801 may determine that no input has occurred. In another example, if a gesture of ignoring the notification is input from the user, the first processor 801 may determine that the notification is ignored. For instance, as shown in FIG. 17, if a gesture of the user turning the electronic device 100 over is detected after the notification is output, the first processor 801 may determine that the notification is ignored. The gesture of the user may be sensed, for example, by the sensor module 307.

If the notification is ignored or no input occurs, the first processor 801 may perform operation 1107; otherwise, the first processor 801 may perform operation 1109.

In operation 1107, the first processor 801 may determine the wake-up period to be the maximum period and may transmit a wake-up period change request to the wireless LAN module. In one example, the first processor 801 may transmit the wake-up period change request along with the maximum wake-up period. The maximum period may be, for example, a predefined value. Specifically, the maximum period may be one second.

In operation 1109, the first processor 801 may check the received signal strength of the AP 110 involved in communication. In operation 1111, the first processor 801 may check whether the received signal strength exceeds a predefined second threshold value. The second threshold value may be, for example, a value corresponding to an intermediate level of the checked received signal strength. If the received signal strength exceeds the second threshold value, the first processor 801 may perform operation 1113; otherwise, the first processor 801 may perform operation 1119.

In operation 1113, the first processor 801 may check whether the electronic device 100 is traveling. In one example, the first processor 801 may check whether the electronic device 100 is traveling based on a change in received signal strength. Specifically, if a first received signal strength relating to a previously received signal is different from a second received signal strength relating to a currently received signal, the first processor 801 may determine that the electronic device 100 is traveling. However, if the first received signal strength and the second received signal strength are the same, the first processor 801 may determine that the electronic device 100 is not traveling.

In another example, the first processor 801 may check, using the accelerometer included in the sensor module 307, whether the electronic device 100 is traveling. For instance, the accelerometer may monitor the value of the accelerometer and may store the value in a buffer (e.g., the memory 313), and the first processor 801 may check whether the electronic device 100 is traveling based on the value of the accelerometer stored in the buffer. In still another example, the first processor 801 may check, using a GPS module, whether the electronic device 100 is traveling.

If the electronic device 100 is traveling, the first processor 801 may perform operation 1115; otherwise, the first processor 801 may perform operation 1117. In operation 1115, the first processor 801 may check the movement speed of the electronic device 100. In one example, the first processor 801 may calculate the movement speed of the electronic device 100 based on the accelerometer included in the sensor module 307. In another example, the first processor 801 may calculate the travel distance of the electronic device 100 based on the received signal strength and may calculate the movement speed of the electronic device 100 based on the calculated travel distance. In still another example, the first processor 801 may calculate the travel distance of the electronic device 100 using the GPS module and may calculate the movement speed of the electronic device 100 based on the calculated travel distance.

Then, the first processor 801 may check whether the checked movement speed exceeds a third threshold value or the received signal strength is less than a fourth threshold value. The third threshold value may be determined, for example, based on the user's movement through running or riding a bicycle or car. The fourth threshold value may be determined, for example, based on the received signal strength if the electronic device 100 is out of the reception range of the AP 110.

If the checked movement speed exceeds the third threshold value or the received signal strength is less than the fourth threshold value, the first processor 801 may perform operation 1119; otherwise, the first processor 801 may perform operation 1117.

In operation 1117, the first processor 801 may determine a wake-up period and may transmit a wake-up period change request to the wireless LAN module 805. Here, the first processor 801 may determine that the electronic device 100 stops or is traveling at a low speed and is located in the cell 111 of the AP 110 and may then determine a wake-up period. For example, the first processor 801 may determine a new wake-up period by doubling the current wake-up period. In one example, the first processor 801 may transmit the wake-up period change request along with the determined wake-up period.

In operation 1119, the first processor 801 may determine the wake-up period to be a predefined active wake-up period and may transmit a wake-up period change request to the wireless LAN module. Here, the first processor 801 may determine that the electronic device 100 has a received signal strength relating to the AP 110 that is below average, is traveling at a high speed, or is out of the cell 111 of the AP 110 and may then determine the wake-up period. In one example, the first processor 801 may transmit the wake-up period change request. In another example, the first processor 801 may transmit the wake-up period change request along with an indicator to request the implementation of the power save mode according to the active wake-up period.

Figure 12:
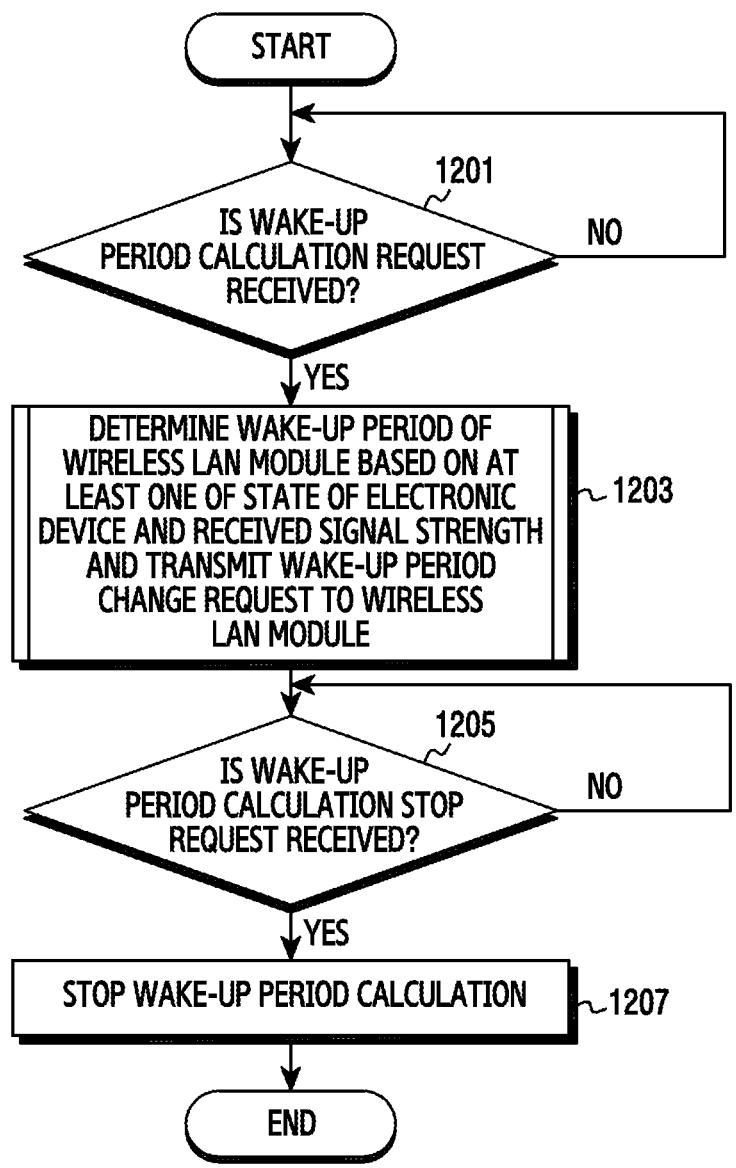
FIG. 12 is a flowchart illustrating that a second processor controls the wake-up period of a wireless LAN module according to various embodiments of the present disclosure.

FIG. 12 is a flowchart illustrating that a second processor controls the wake-up period of a wireless LAN module according to various embodiments of the present disclosure.

Referring to FIG. 12, in operation 1201, the second processor 803 may check whether a wake-up period calculation request is received from the first processor. If a wake-up period calculation request is received, the second processor 803 may perform operation 1203; otherwise, the second processor 803 may repeat operation 1201.

In operation 1203, the second processor 803 may determine the wake-up period of the wireless LAN module 805 based on at least one of the state of the electronic device 100 and a received signal strength and may transmit a wake-up period change request to the wireless LAN module 805. For example, the second processor 803 may determine the wake-up period based on the movement speed of the electronic device 100 and the received signal strength. The wake-up period change request may include, for example, the determined wake-up period.

In operation 1205, the second processor 803 may check whether a wake-up period calculation stop request is received from the first processor 801. If a wake-up period calculation stop request is received, the second processor 803 may perform operation 1207; otherwise, the second processor 803 may repeat operation 1205.

In operation 1207, the second processor 803 may stop an operation of calculating a wake-up period.

According to one embodiment, the second processor 803 may switch between the active mode and the sleep mode based on the wake-up period of the wireless LAN module 805. For example, if the wireless LAN module 805 is in the awake state, the second processor 803 may be in the active mode; if the wireless LAN module 805 is in the doze state, the second processor 803 may be in the sleep mode. For example, the second processor 803 may calculate the wake-up period if the wireless LAN module 805 is in the awake state.

Figure 13:
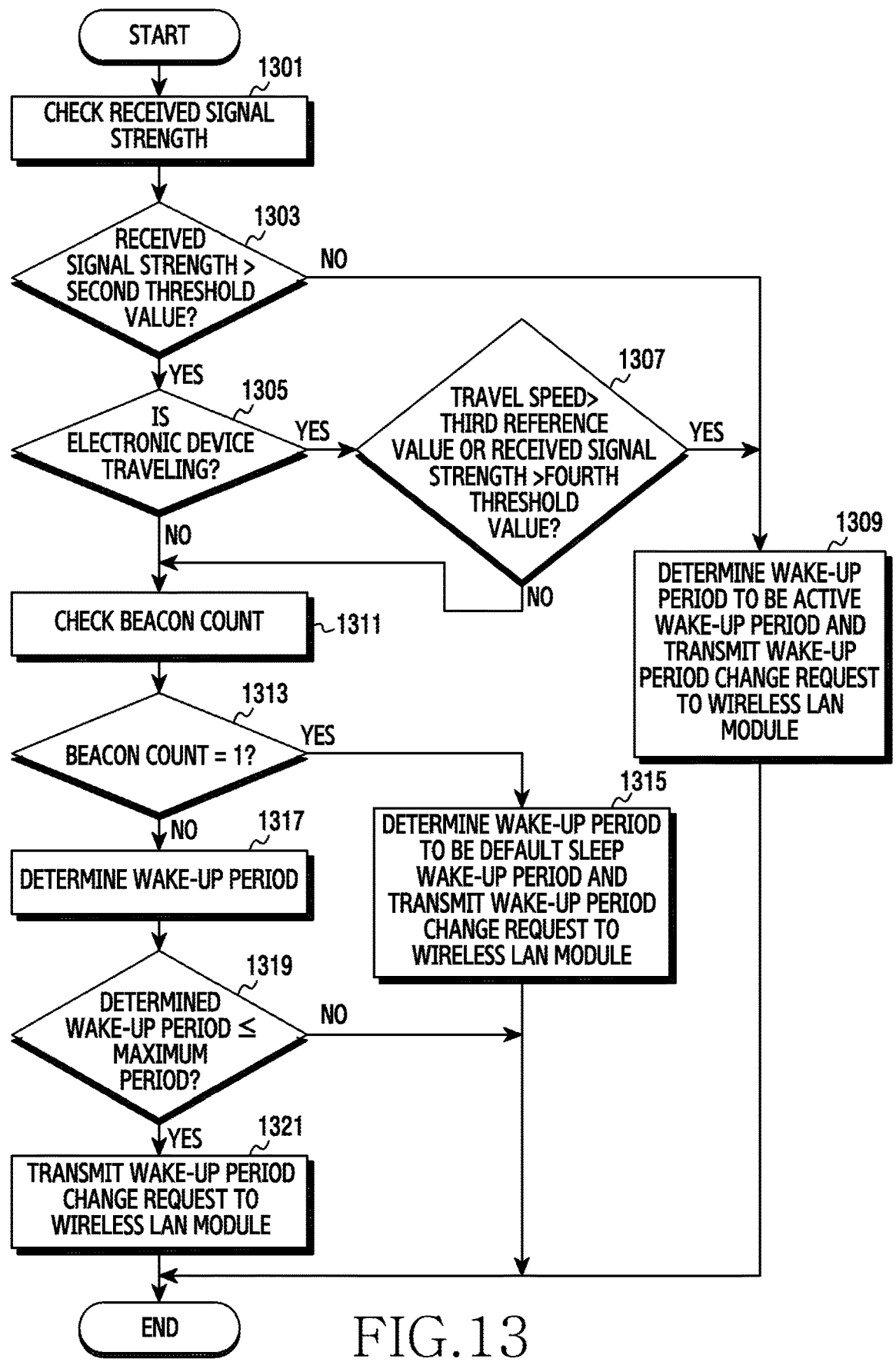
FIG. 13 is a flowchart illustrating that a second processor determines a wake-up period according to various embodiments of the present disclosure.

FIG. 13 is a flowchart illustrating that a second processor determines a wake-up period according to various embodiments of the present disclosure.

Referring to FIG. 13, in operation 1301, the second processor 803 may check the received signal strength of the AP 110 involved in communication. In operation 1303, the second processor 803 may check whether the received signal strength exceeds a predefined second threshold value. The second threshold value may be, for example, a value corresponding to an intermediate level of the checked received signal strength. If the received signal strength exceeds the second threshold value, the second processor 803 may perform operation 1305; otherwise, the first processor 801 may perform operation 1309.

In operation 1305, the second processor 803 may check whether the electronic device 100 is traveling. In one example, the second processor 803 may check whether the electronic device 100 is traveling based on a change in received signal strength. Specifically, if a first received signal strength relating to a previously received signal is different from a second received signal strength relating to a signal currently being received, the second processor 803 may determine that the electronic device 100 is traveling. However, if the first received signal strength and the second received signal strength are the same, the second processor 803 may determine that the electronic device 100 is not traveling.

In another example, the second processor 803 may check, using the accelerometer included in the sensor module 307, whether the electronic device 100 is traveling. For instance, the accelerometer may monitor the value of the accelerometer and may store the value in a buffer (e.g., the memory 313), and the second processor 803 may check whether the electronic device 100 is traveling based on the value of the accelerometer stored in the buffer. In still another example, the second processor 803 may check, using a GPS module, whether the electronic device 100 is traveling.

If the electronic device 100 is traveling, the second processor 803 may perform operation 1307; otherwise, the second processor 803 may perform operation 1311. In operation 1307, the second processor 803 may check the movement speed of the electronic device 100. In one example, the second processor 803 may calculate the movement speed of the electronic device 100 based on the accelerometer included in the sensor module 307. In another example, the second processor 803 may calculate the travel distance of the electronic device 100 based on the received signal strength and may calculate the movement speed of the electronic device 100 based on the calculated travel distance. In still another example, the second processor 803 may calculate the travel distance of the electronic device 100 using the GPS module and may calculate the movement speed of the electronic device 100 based on the calculated travel distance.

Then, the second processor 803 may check whether the checked movement speed exceeds a third threshold value or the received signal strength is less than a fourth threshold value. The third threshold value may be determined, for example, based on the user's movement through running or riding a bicycle or car. The fourth threshold value may be determined, for example, based on the received signal strength if the electronic device 100 is out of the reception range of the AP 110.

If the checked movement speed exceeds the third threshold value or the received signal strength is less than the fourth threshold value, the second processor 803 may perform operation 1309; otherwise, the second processor 803 may perform operation 1311.

In operation 1309, the second processor 803 may determine the wake-up period to be a predefined active wake-up period and may transmit a wake-up period change request to the wireless LAN module. Here, the second processor 803 may determine that the electronic device 100 has a received signal strength relating to the AP 110 that is below average, is traveling at a high speed, or is out of the cell 111 of the AP 110 and may then determine the wake-up period. In one example, the second processor 803 may transmit the wake-up period change request. In another example, the second processor 803 may transmit the wake-up period change request along with an indicator to request the implementation of the power save mode according to the active wake-up period. In still another example, the second processor 803 may transmit the wake-up period change request along with the active wake-up period.

In operation 1311, the second processor 803 may check a beacon count. The beacon count may mean, for example, the number of wakeups that are switches from the doze state in the sleep mode. For example, a beacon count of 1 may mean that a first wakeup is performed in the sleep mode.

In operation 1313, the second processor 803 may check whether the beacon count is 1. If the beacon count is 1, the second processor 803 may perform operation 1315; otherwise, the second processor 803 may perform operation 1317. For example, if a wake-up period calculation request is received, the second processor 803 may calculate a beacon count.

In operation 1315, the second processor 803 may determine the wake-up period to be a default sleep wake-up period and may transmit a wake-up period change request to the wireless LAN module. Here, the second processor 803 may determine that the first wakeup is performed in the sleep mode and may then determine the wake-up period to be the default sleep wake-up period. In one example, the second processor 803 may transmit only the wake-up period change request. In another example, the second processor 803 may transmit the wake-up period change request along with an indicator to request the implementation of the power save mode according to the default sleep wake-up period. In still another example, the second processor 803 may transmit the wake-up period change request and the default sleep wake-up period together.

In operation 1317, the second processor 803 may determine a wake-up period. For example, the second processor 803 may determine a new wake-up period by doubling the current wake-up period. In operation 1319, the second processor 803 may check whether the determined wake-up period is less than or equal to a predefined maximum period. If the determined wake-up period is less than or equal to the maximum period, the second processor 803 may perform operation 1321; otherwise, the second processor 803 may terminate an operation of determining a wake-up period.

In operation 1321, the second processor 803 may transmit a wake-up period change request to the wireless LAN module 805. For example, the second processor 803 may transmit the wake-up period change request along with the determined wake-up period.

Figure 14A:
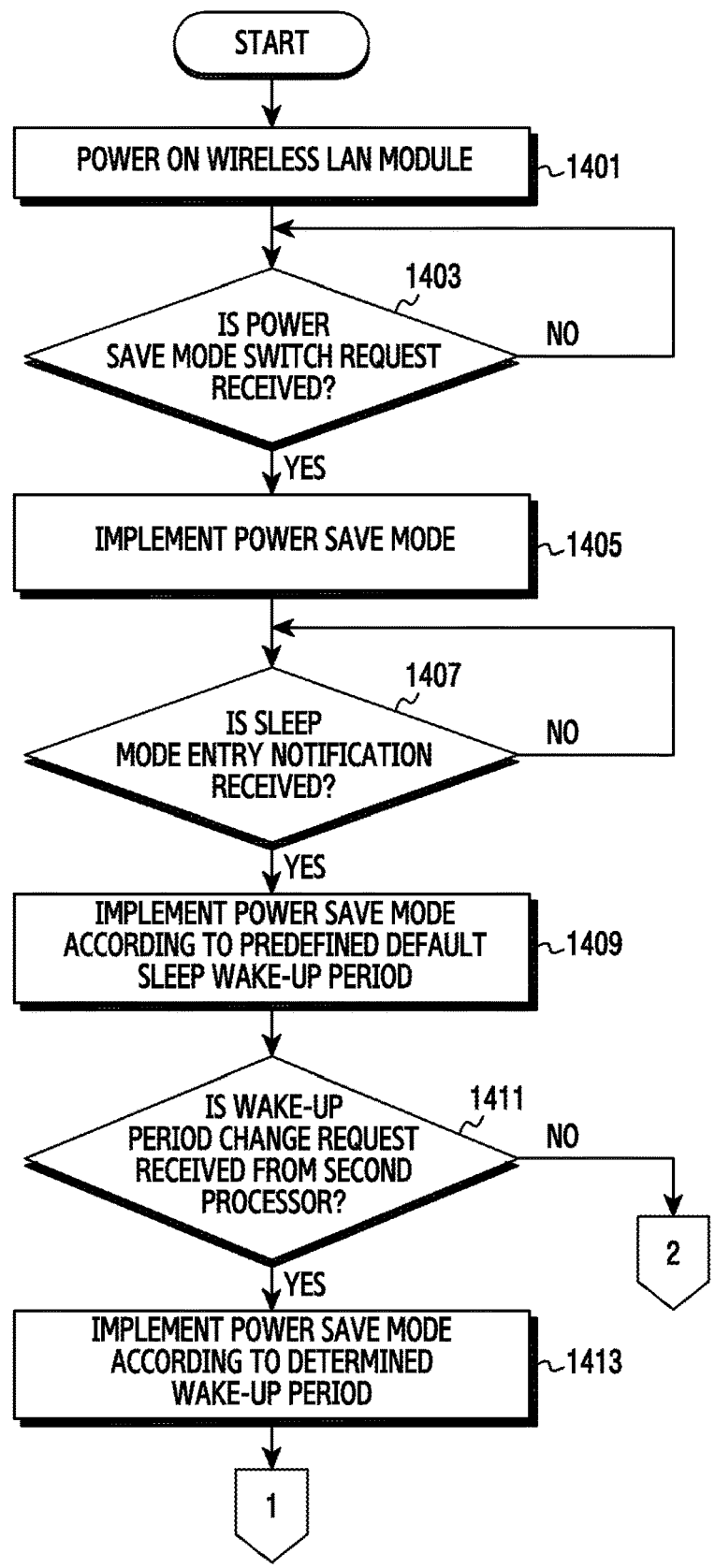
FIGS. 14A and 14B are flowcharts illustrating that a wireless LAN module implements a power save mode based on a wake-up period according to various embodiments of the present disclosure.
Figure 14B:
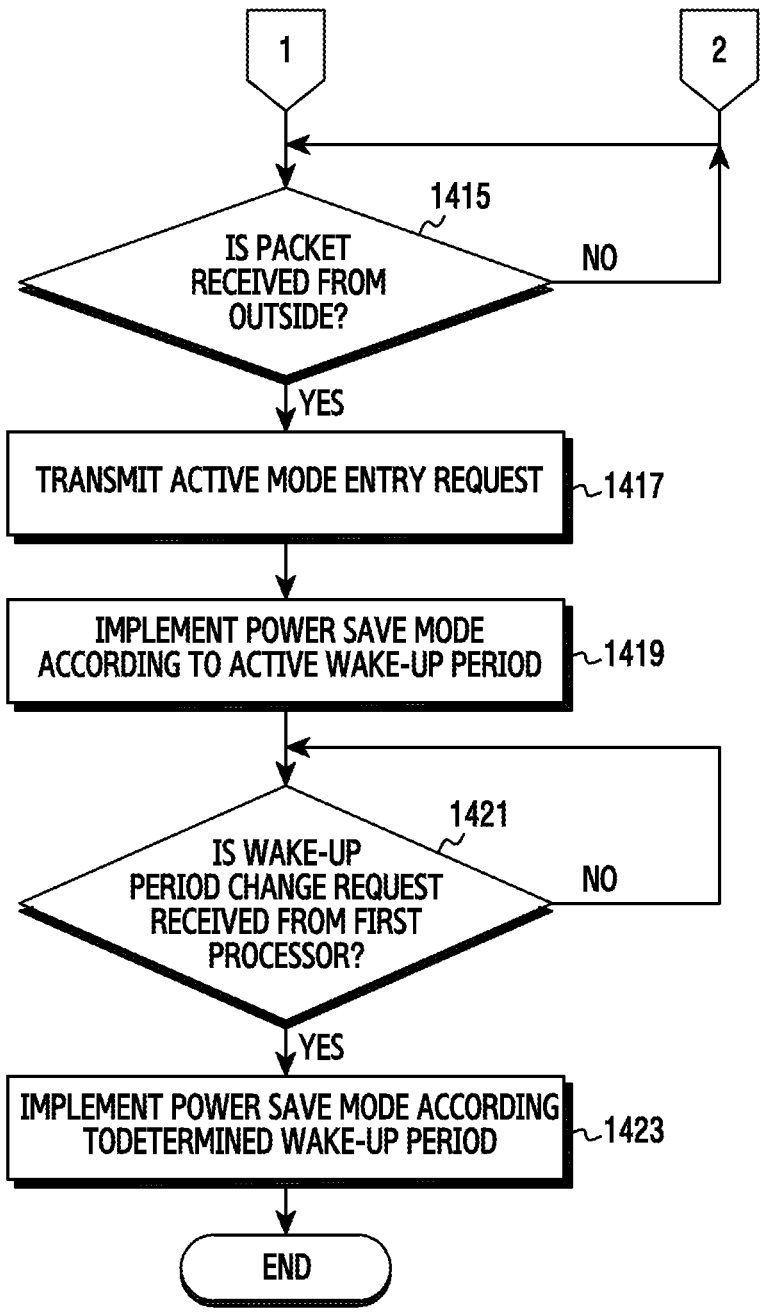

FIGS. 14A and 14B are flowcharts illustrating that a wireless LAN module implements a power save mode based on a wake-up period according to various embodiments of the present disclosure.

Referring to FIGS. 14A and 14B, in operation 1401, the wireless LAN module 805 may be supplied with power to be turned on. Power may be supplied, for example, under the control of the first processor 801.

In operation 1403, the wireless LAN module 805 may check whether a power save mode switch request is received from the first processor 801. The power save mode switch request may be received, for example, along with a wake-up period determined by the first processor 801. If a power save mode switch request is received, the wireless LAN module 805 may perform operation 1405; otherwise, the wireless LAN module 805 may repeat operation 1403.

In operation 1405, the wireless LAN module 805 may implement the power save mode. For example, if only the power save mode switch request is received, the wireless LAN module 805 may implement the power save mode according to a predefined active wake-up period. In another example, if the power save mode switch request and a determined wake-up period are received together, the wireless LAN module 805 may implement the power save mode according to the determined wake-up period.

In operation 1407, the wireless LAN module 805 may check whether a sleep mode entry notification is received from the first processor 801. If a sleep mode entry notification is received, the wireless LAN module 805 may perform operation 1409; otherwise, the wireless LAN module 805 may repeat operation 1407.

In operation 1409, the wireless LAN module 805 may implement the power save mode according to a predefined default sleep wake-up period. For instance, if the default sleep wake-up period is 100 ms, the wireless LAN module 805 may switch from the doze state to the awake state every 100 ms.

In operation 1411, the wireless LAN module 805 may check whether a wake-up period change request is received from the second processor 803. For example, the wake-up period change request may be received along with a wake-up period determined by the second processor 803. If a wake-up period change request is received, the wireless LAN module 805 may perform operation 1413; otherwise, the wireless LAN module 805 may perform operation 1415.

In operation 1413, the wireless LAN module 805 may implement the power save mode according to a determined wake-up period. For instance, if the current wake-up period is 100 ms and the determined wake-up period is 200 ms, the wireless LAN module 805 may change the wake-up period from 100 ms to 200 ms and may implement the power save mode according to the changed 200 ms.

In operation 1415, the wireless LAN module 805 may check whether a packet is received from the outside. For example, if communicating with the AP 110, the wireless LAN module 805 may check whether data is received from the AP 110. If a packet is received from the outside, the wireless LAN module 805 may perform operation 1417; otherwise, the wireless LAN module 805 may repeat operation 1415.

In operation 1417, the wireless LAN module 805 may transmit an active mode entry request to the first processor 801. In operation 1419, the wireless LAN module 805 may implement the power save mode according to a predefined active wake-up period. For instance, if the active wake-up period is 50 ms, the wireless LAN module 805 may switch from the doze state to the awake state every 50 ms.

In operation 1421, the wireless LAN module 805 may check whether a wake-up period change request is received from the first processor 801. For example, the wireless LAN module 805 may receive a wake-up period change request along with a wake-up period determined by the first processor 801. If a wake-up period change request is received, the wireless LAN module 805 may perform operation 1423; otherwise, the wireless LAN module 805 may repeat operation 1421.

In operation 1423, the wireless LAN module 805 may implement the power save mode according to a determined wake-up period. For instance, if the determined wake-up period is 200 ms, the wireless LAN module 805 may switch from the doze state to the awake state every 200 ms.

Figure 15:
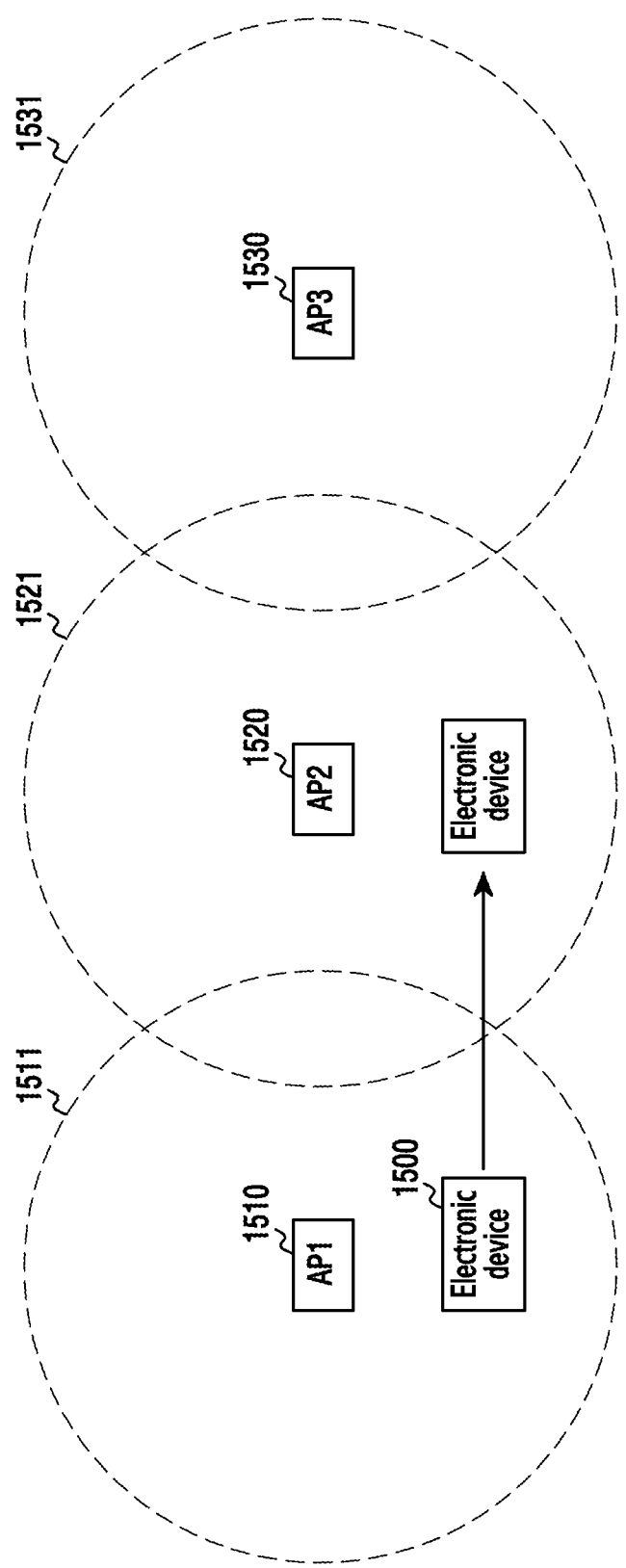
FIG. 15 illustrates an electronic device that performs a handover between APs according to various embodiments of the present disclosure.

FIG. 15 illustrates an electronic device that performs a handover between APs according to various embodiments of the present disclosure.

Referring to FIG. 15, a communication system may include AP1 1510, AP2 1520, AP3 1530, and an electronic device 1500.

AP1 1510, AP2 1520, and AP3 1530 have cell1 1511, cell2 1521, and cell3 1531, respectively, and can communicate with the electronic device 1500 located in the cell thereof. AP1 1510, AP2 1520, and AP3 1530 may be installed adjacent to each other to enable a handover.

If the electronic device 1500 travels from cell1 1511 to cell2 1521, a first processor 301, a second processor 305, or a wireless LAN module 303 of the electronic device 1500 may be handed over to an AP having the same SSID (e.g., AP2 1520) as the AP to which the electronic device 1500 is currently connected (e.g., AP1 1510).

However, if a handover is impossible, a first processor 301, a second processor 305, or a wireless LAN module 303 may monitor a received signal strength (e.g., an RSSI) every wake-up period used in the awake state, thereby checking whether the electronic device 1500 is disconnected from AP1 1510. If the electronic device 1500 travels at the same speed after disconnected from the AP1 1510, the first processor 301, the second processor 305, or the wireless LAN module 303 may increase an AP scanning period for a connection with a new AP, thereby preventing an unnecessary AP disconnection.

For example, if the user of the electronic device 1500 walks in an area congested with APs having a wireless LAN handover function, the electronic device 1500 performs a handover between the APs using the wireless LAN handover function, thereby preventing a switch between a wireless LAN and mobile communication (3G and LTE). Thus, the electronic device 1500 can reduce the power consumption of a battery.

In another example, if the user of the electronic device 1500 runs or rides a bicycle or car and thus the electronic device 1500 travels at a high speed, the electronic device 1500 is soon to be disconnected from the AP to which the electronic device 1500 is currently connected and is then also soon to be disconnected from an AP to which the electronic device 1500 has connected due to a decrease in received signal strength (e.g., RSSI). In this case, the first processor 301, the second processor 305, or the wireless LAN module 303 may detect a disconnection from the AP to which the electronic device 1500 is currently connected in advance using the wake-up period (beacon period and DTIM period) of the awake state and may not perform an operation of scanning a new AP to which the electronic device 1500 can be connected or may increase a scanning period, thereby reducing a frequent switch between a wireless LAN and wireless mobile communications (3G and LTE). Thus, the electronic device 1500 can reduce power consumption.

Figure 16:
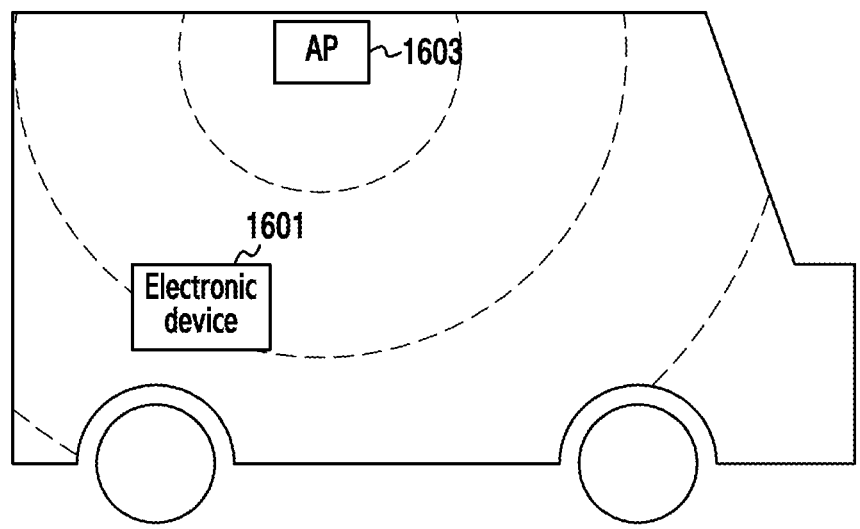
FIG. 16 illustrates an electronic device that maintains a constant speed relative to an AP according to various embodiments of the present disclosure.

FIG. 16 illustrates an electronic device that maintains a constant speed relative to an AP according to various embodiments of the present disclosure.

Referring to FIG. 16, the AP 1603 may be located in a vehicle (e.g., a bus, a car, a subway, an airplane, a ship, or the like), and the electronic device 1601 may be located in the vehicle.

If the electronic device 1601 travels due to the vehicle or a user, a first processor 301, a second processor 305, or a wireless LAN module 303 may control a wake-up period (at least one of a beacon period and a DTIM period) based on the movement speed of the electronic device 1601 relative to the speed of the AP 1603.

Various methods may be used to check whether the electronic device 1601 is traveling. For example, it may be determined based on a change in received signal strength (RSSI) whether the electronic device 1601 is traveling. Alternatively, if the electronic device 1601 enters the sleep mode and a sensor module 307 is activated, the electronic device 1601 may determine using the sensor module 307 whether the electronic device 1601 is traveling. In one example, if the sensor module 307 monitors the value of an accelerometer and stores the value in a buffer (e.g., a memory 313), the second processor 305 may check using the stored value of the accelerometer whether the electronic device 1601 is traveling. In another example, if the electronic device 1601 is traveling with a sport tracking application used, the sensor module 307 may receive a GPS signal and may calculate the movement speed. In this case, the second processor 305 may determine whether the electronic device 1601 is traveling using the coordinates of a GPS or a speed calculated based on the coordinates of the GPS.

If the received signal strength of the AP 1603 does not decrease while the electronic device 1601 is traveling, the first processor 301 or the second processor 305 may determine that the electronic device 1601 and the AP 1603 travel at the same speed. In this case, the first processor 301 or the second processor 305 may determine the wake-up period (at least one of the beacon period and the DTIM period) assuming that the electronic device 1601 is stopped.

FIGS. 15 and 16 show that the first processor 301 or the second processor 305 determines the wakeup period of the wireless LAN module 303 based on the movement speed of the electronic device 100 and the received signal strength of the AP 110.

In one embodiment, the first processor 301 or the second processor 305 may determine the wakeup period of the wireless LAN module 303 based on not only the movement speed of the electronic device 100 and the received signal strength of the AP 110 but also at least one of the display on/off, network usage information (e.g., frequency of use and usage rate) relating to the electronic device 100 or each application, the features of an application, and a state change of the electronic device 100 relating to a notification.

For example, if an application currently being used (or recently used) is an application that uses a wireless LAN/wireless communication network with low frequency, the electronic device 100 may determine that there is a low probability that a packet is received using the wireless LAN/wireless mobile communication. In this case, the electronic device 100 may increase the wake-up period of the wireless LAN module 303. In another example, if the application currently being used is an application that uses a wireless LAN/wireless communication network with high frequency, the electronic device 100 may determine that there is a high probability that a packet is received via the wireless LAN/wireless communication network. In this case, the electronic device 100 may maintain or reduce the wake-up period of the wireless LAN module 303. Therefore, the electronic device 100 may control the wake-up period of the wireless LAN module 303 based on the network usage rate of each application and the features of the application.

In another embodiment, the electronic device 100 may determine the wake-up period of the wireless LAN module 303 based on the network usage rate of a currently used application and a network usage history.

For example, if the currently used application is a web browser, the web browser may request and receive a Uniform Resource Identifier (URI) via the wireless LAN module 303. After the URI is received, if the web browser transmits/receives data to/from a server using web socket communication or does not frequently update the screen, the electronic device 100 does not use the wireless LAN module 303 until the user explicitly requests another URI. In this case, the electronic device 100 may increase the wake-up period (at least one of the beacon period and the DTIM period), because a delay may be less likely to occur in packet delivery.

In another embodiment, if a currently running application is high wireless network usage, the electronic device 100 may adjust the wake-up period based on the features of the application.

For example, if the currently running application frequently uses a wireless network, the electronic device 100 may not increase the wake-up period for a predefined time. Specifically, if the currently running application is a messaging application and the messaging application is frequently used, the electronic device 100 may determine that there is a high probability of receiving a new message via the wireless LAN module 303 even if the display is turned off. In this case, even if the first processor 301 enters the sleep mode, the second processor 305 may not increase the wake-up period for a predefined time and may then gradually increases the wake-up period so as not to interrupt a response to the message.

FIG. 17 illustrates the state change of an electronic device relating to a notification about a received packet according to various embodiments of the present disclosure.

The electronic device 100 may adjust the wake-up period based on the state change of the electronic device 100 relating to a notification. For example, with the first processor 301 entering the sleep mode, if the wireless LAN module 303 receives a packet, the wireless LAN module 303 may store the received packet in the memory 313 and may transmit an active mode entry request to the first processor 301. The first processor 301 may switch from the sleep mode to the active mode according to the active mode entry request, may receive the packet stored in the memory 313, and may output a notification corresponding to the received packet.

The received packet may be, for example, a message (SMS or MMS), a call, an email, an advertisement, or the like. The notification may be, for example, a message reception notification, a call reception notification, an email reception notification, an advertisement reception notification, or the like. For example, if the packet is a message, the electronic device 1701 may display the content of the message 1703 on the display.

If the notification is not checked or is ignored by the user for a predefined time, the first processor 301 may determine that the user is not using or not carrying the electronic device 100 at the time after the predefined time. For example, if no input is received from the user for the predefined time after the display is turned off as in 1705, the first processor 301 may determine that the user is not using or not carrying the electronic device 100. In another example, if the electronic device is turned over by the user as in 1707, the first processor 301 may determine that the user is not using the electronic device 100.

Further, the first processor 301 may determine that the user cannot recognize a delay in the transmission of the packet occurring for the predefined time at the time and may increase the wake-up period of the wireless LAN module 303. Accordingly, the electronic device 100 may reduce the power consumption of a battery.

In one embodiment, the electronic device 100 may adjust the wake-up period of the wireless LAN module 303 based on the state change of the electronic device 100 relating to the notification and the user's life history. For example if the notification is not checked or is ignored by the user for the predefined time, the first processor 301 may determine that the user is not using or not carrying the electronic device 100 at the time after the predefined time.

Then, the electronic device may estimate the user's behavior at the time based on the user's life history. If the time is the bedtime of the user, the first processor 301 may increase the wake-up period of the wireless LAN module 303. Accordingly, the electronic device 100 may reduce the power consumption of the battery.

The received signal strength is not considered in various embodiments of the notification. In one embodiment, the wake-up period of the wireless LAN module 303 may be adjusted in consideration of the received signal strength. For example, if the received signal strength is low, excessively increasing the wake-up period may disconnect communication with the AP 110 to cause a switch from a wireless LAN to a wireless communication network, thus increasing power consumption and increasing the quantity of packets received via the wireless communication network. Thus, the first processor 301 may restrict an upper limit for adjusting the wake-up period.

Figure 18A:
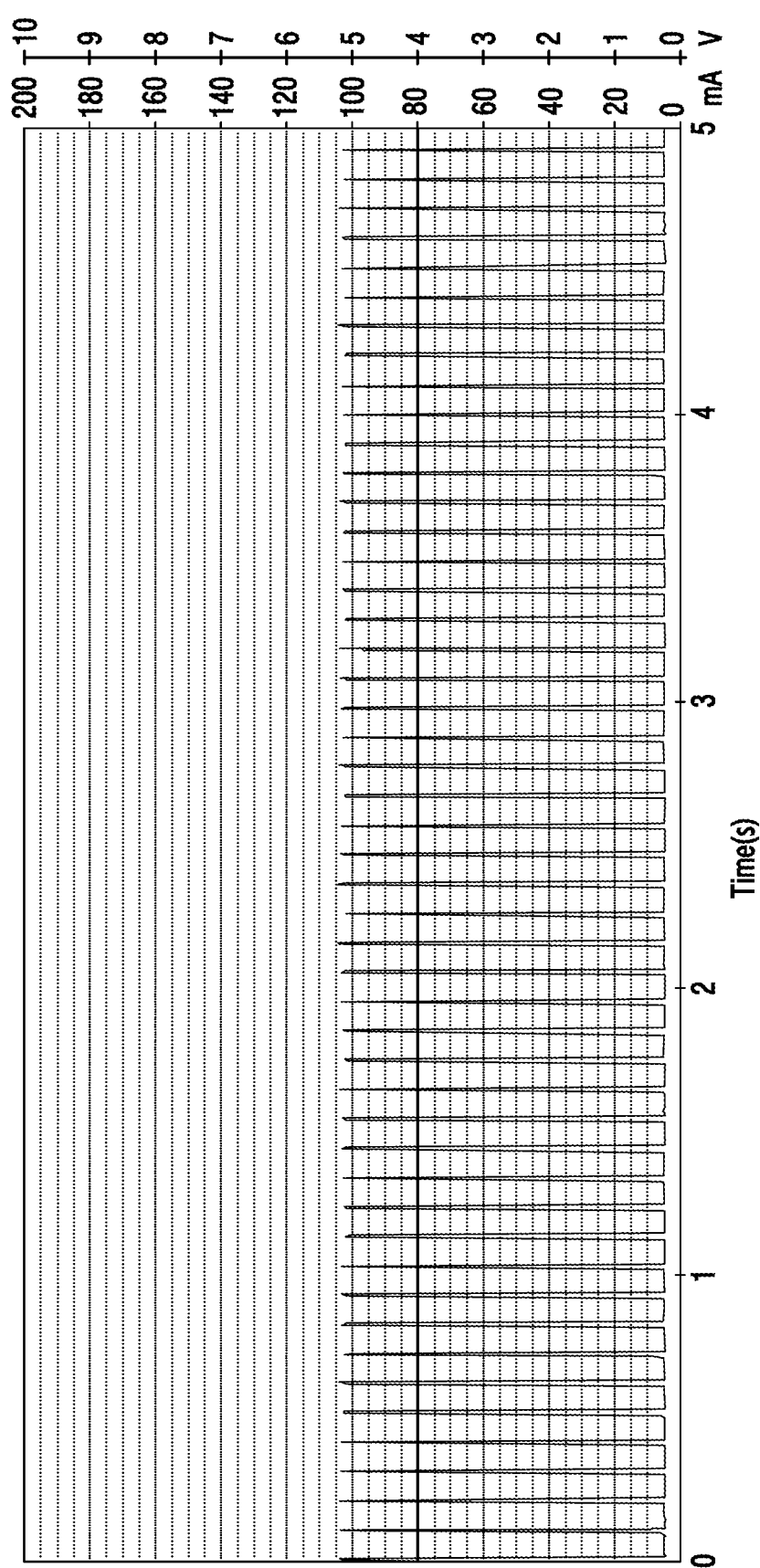
FIGS. 18A and 18B illustrate the current consumption of a wireless LAN module according to various embodiments of the present disclosure.
Figure 18B:
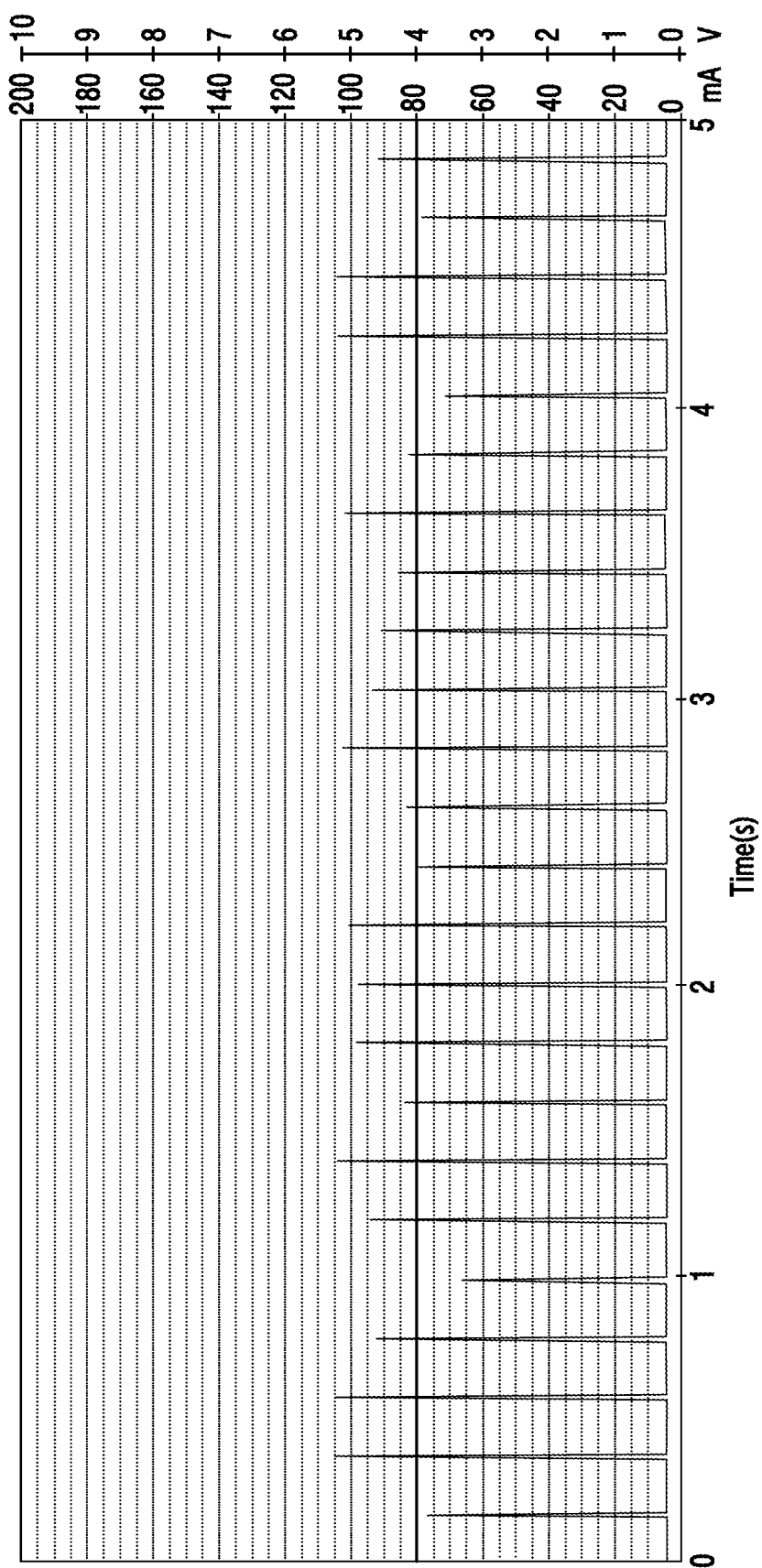

FIGS. 18A and 18B illustrate the current consumption of a wireless LAN module according to various embodiments of the present disclosure.

Referring to FIGS. 18A and 18B, a graph 1801 illustrates the current consumption of the wireless LAN module 303 if the wake-up period is 100 ms. A graph 1803 illustrates the current consumption of the wireless LAN module 303 if the wake-up period is 200 ms.

The power consumption in the two graphs may be illustrated below in Table 1.

TABLE 1

| Wake-up period | 100 ms | 200 ms |
|---|---|---|
| Average power | 58.36 mW | 28.16 mW |
| Average current | 14.59 mW | 7.04 mA |
| Consumed energy | 4.04 uAh | 1.95 uAh |

Referring to Table 1, the average power, the average current, and the consumed energy at a wake-up period of 200 ms is half the average power, the average current, and the consumed energy at a wake-up period of 100 ms.

Therefore, decreasing the wake-up period may reduce the energy consumption of the wireless LAN module 303, resulting in a decrease in the battery consumption of the electronic device 100. The decrease in the battery consumption enables the electronic device 100 to be used for an increased time.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, if executed by a processor (e.g., the processor 110), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

The invention claimed is:

1. A method of operating an electronic device, the method comprising:
   determining whether a wireless communication module of the electronic device is stopped based on a state of the electronic device;
   in case the wireless communication module is not stopped, determining whether a video streaming application is running;
   in case the video streaming application is running, determining whether a display of the electronic device is turned off;
   in case the display is turned off, determining whether a received signal strength of an access point (AP) currently involved in communication with the electronic device is greater than a threshold;
   in case the received signal strength is greater than the threshold, calculating an average bit rate of a video content of the video streaming application and a current transmission rate;
   in case the current transmission rate is 1.5 times or higher than the average bit rate, determining a wake-up period based on the average bit rate and the current transmission rate, wherein the wake-up period is based on a beacon period;
   controlling the wireless communication module based on the wake-up period; and
   maintaining the wireless communication module in an awake state in case the display is not turned off, in case the received signal strength is not greater than the threshold or in case the current transmission rate is not 1.5 times or higher than the average bit rate.

2. The method of claim 1, wherein the state of the electronic device comprises:
   application network usage information.

3. The method of claim 2, further comprising:
   controlling the wireless communication module of the electronic device further based on a beacon count that represents a number of wake-ups in a sleep mode of the electronic device if a received signal strength exceeds a predefined first threshold value and a movement speed of the electronic device is less than or equal to a predefined second threshold value.

4. The method of claim 1, further comprising:
   outputting a notification of a received packet in an active mode of the electronic device;
   detecting a user input responsive to the notification; and
   controlling the wireless communication module of the electronic device further based on the user input.

5. The method of claim 1, further comprising:
   executing a power save mode of the wireless communication module based on the wake-up period.

6. An electronic device comprising:
   a wireless communication module;
   display; and
   a first processor configured to:
      determine whether the wireless communication module is stopped based on a state of the electronic device,
      in case the wireless communication module is not stopped, determine whether a video streaming application is running,
      in case the video streaming application is running, determine whether the display is turned off,
      in case the display is turned off, determine whether a received signal strength of an access point (AP)

currently involved in communication with the electronic device is greater than a threshold, in case the received signal strength is greater than the threshold, calculate an average bit rate of a video content of the video streaming application and a current transmission rate, in case the current transmission rate is greater than the average bit rate, determine a wake-up period based on the average bit rate and the current transmission rate, wherein the wake-up period is based on a beacon period, control the wireless communication module based on the wake-up period, maintain the wireless communication module in an awake state in case the display is not turned off, in case the received signal strength is not greater than the threshold or in case the current transmission rate is not 1.5 times or higher than the average bit rate.

7. The electronic device of claim 6, wherein the state of the electronic device comprises:

application network usage information.

8. The electronic device of claim 7, further comprising a second processor configured to control the wireless communication module of the electronic device further based on a beacon count that represents a number of wake-ups in a sleep mode of the electronic device if a received signal strength exceeds a predefined first threshold value and a movement speed of the electronic device is less than or equal to a predefined second threshold value.

9. The electronic device of claim 6, wherein the first processor is further configured to:

output a notification of a received packet in an active mode of the electronic device, detect a user input responsive to the notification, and control the wireless communication module of the electronic device further based on the user input.

10. The electronic device of claim 6, wherein the first processor is further configured to execute a power save mode of the wireless communication module based on the wake-up period.

11. The electronic device of claim 6, wherein the wireless communication module is further configured to change a current wake-up period of the wireless communication module to the determined wake-up period based on a control of the first processor.

* * * * *